United States Patent [19]
Zink

[11] Patent Number: 5,386,845
[45] Date of Patent: * Feb. 7, 1995

[54] FLUID TRANSPORT APPARATUS WITH SIDE RECESSED FITTING WELL

[75] Inventor: Donald L. Zink, Billings, Mont.

[73] Assignee: Montana Sulphur & Chemical Company, Billings, Mont.

[ * ] Notice: The portion of the term of this patent subsequent to Oct. 12, 2010 has been disclaimed.

[21] Appl. No.: 125,755

[22] Filed: Sep. 24, 1993

Related U.S. Application Data

[60] Division of Ser. No. 802,699, Dec. 5, 1991, Pat. No. 5,251,650, which is a continuation of Ser. No. 595,464, Oct. 10, 1990, abandoned.

[51] Int. Cl.⁶ .............................................. F16K 24/00
[52] U.S. Cl. .................................... 137/350; 137/585; 137/587
[58] Field of Search ............... 137/350, 587, 585, 347, 137/358; 105/360

[56] References Cited

U.S. PATENT DOCUMENTS

| | | |
|---|---|---|
| 113,153 | 3/1871 | Fisher . |
| 574,420 | 1/1897 | Heiser ................................. 220/243 |
| 715,355 | 12/1902 | Dees . |
| 729,272 | 5/1903 | Burney ............................ 220/344 X |
| 791,779 | 6/1905 | Heiser ............................ 220/344 X |
| 997,556 | 7/1911 | Hoyer ............................ 220/661 X |
| 1,053,344 | 2/1913 | Asbury . |
| 1,442,525 | 1/1923 | Howard . |
| 1,542,116 | 6/1925 | Welcker . |
| 1,544,024 | 6/1925 | Hoeller et al. . |
| 1,627,807 | 5/1927 | Roussie . |
| 1,699,527 | 1/1930 | Folmsbee . |
| 1,759,734 | 2/1930 | Davenport . |
| 1,897,164 | 2/1933 | Endacott . |
| 1,933,233 | 10/1933 | Wakefield . |
| 2,006,924 | 7/1935 | Kizer . |
| 2,048,454 | 7/1936 | Kinzer . |
| 2,067,993 | 1/1937 | Thwaits . |
| 2,092,925 | 9/1937 | Lithgow . |
| 2,096,444 | 10/1937 | Arvintz . |
| 2,102,124 | 12/1937 | Lithgow .............................. 105/360 |
| 2,290,038 | 7/1942 | Folmsbee ........................... 105/358 |
| 2,423,879 | 7/1947 | De Frees . |
| 2,548,190 | 4/1951 | Arpin, Jr. . |
| 2,582,997 | 1/1952 | Laurent ............................... 220/243 |
| 2,611,503 | 9/1952 | Griswold ............................ 220/244 |

(List continued on next page.)

FOREIGN PATENT DOCUMENTS 199986  7/1923  United Kingdom ................ 220/343

OTHER PUBLICATIONS

GATZ–Side Loading And Unloading Arrangement For DOT–114A34OW LPG Cars, date believed to be before Oct. 10, 1990, 1992.

Primary Examiner—A. Michael Chambers
Attorney, Agent, or Firm—Banner, Birch, McKie & Beckett

[57] ABSTRACT

A tube well extends through a fluid containment compartment and is secured at both ends thereof to the compartment shell. Both ends of the well communicate with respective shell openings. Compartment fittings and/or equipment are positioned in the tube and are accessible through at least one of the openings. Both openings can be sealed and the well pressurized, to prevent pressurized fluid in the compartment from leaking through the equipment and into the tube well.

20 Claims, 13 Drawing Sheets

U.S. PATENT DOCUMENTS

| | | |
|---|---|---|
| 2,675,794 | 4/1954 | Armstrong . |
| 2,723,862 | 11/1955 | Dalglish . |
| 2,747,602 | 5/1956 | Trobridge . |
| 2,858,136 | 10/1958 | Rind . |
| 3,081,104 | 3/1963 | Schmiermann . |
| 3,088,625 | 5/1963 | Schmitz .......................... 220/244 X |
| 3,109,555 | 11/1963 | Samans . |
| 3,157,147 | 11/1964 | Ludwig . |
| 3,187,766 | 6/1965 | Black . |
| 3,209,675 | 10/1965 | Stimpson et al. ................... 105/360 |
| 3,310,070 | 3/1967 | Black . |
| 3,310,197 | 3/1967 | Folmsbee et al. . |
| 3,328,496 | 6/1967 | Graves ................................ 105/360 |
| 3,341,215 | 9/1967 | Spector . |
| 3,478,915 | 11/1969 | Smith .................................. 220/243 |
| 3,658,080 | 3/1972 | Mitchell . |
| 3,666,340 | 5/1972 | Albeanese, III ................ 220/344 X |
| 3,764,036 | 10/1973 | Dale et al. . |
| 3,825,145 | 7/1974 | Reynolds ............................. 220/661 |
| 3,827,595 | 8/1974 | Reynolds ............................. 220/661 |
| 3,845,878 | 11/1974 | Carlson . |
| 3,883,046 | 5/1975 | Thompson et al. . |
| 3,884,255 | 5/1975 | Merkle . |
| 3,889,701 | 6/1975 | Mueller . |
| 4,002,192 | 1/1977 | Mowatt-Larssen ................. 137/347 |
| 4,009,862 | 3/1977 | De Frees . |
| 4,085,865 | 4/1978 | Thompson et al. . |
| 4,163,370 | 1/1980 | Adler . |
| 4,239,060 | 12/1980 | Stoller et al. ....................... 137/350 |
| 4,245,749 | 11/1981 | Graves . |
| 4,553,559 | 11/1985 | Short, III . |
| 4,872,640 | 10/1989 | Schwartz . |
| 4,889,160 | 12/1989 | Sheets ................................. 137/350 |
| 5,097,976 | 3/1992 | Zink et al. . |
| 5,141,013 | 8/1992 | Zink et al. . |
| 5,211,202 | 5/1993 | Zink et al. . |
| 5,220,943 | 6/1993 | Zink . |
| 5,222,517 | 6/1993 | Zink et al. . |
| 5,228,473 | 7/1993 | Zink . |
| 5,238,022 | 8/1993 | Zink . |
| 5,251,658 | 10/1993 | Zink ..................................... 137/347 |

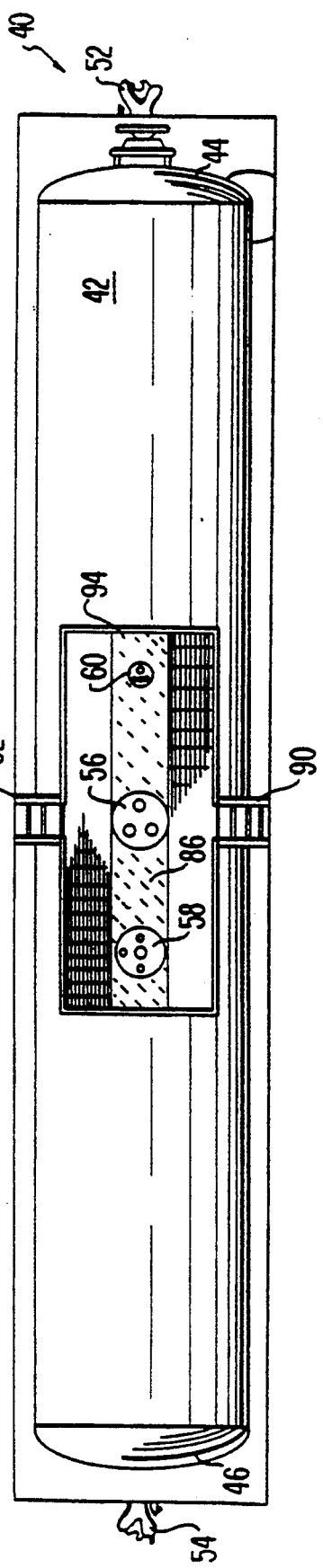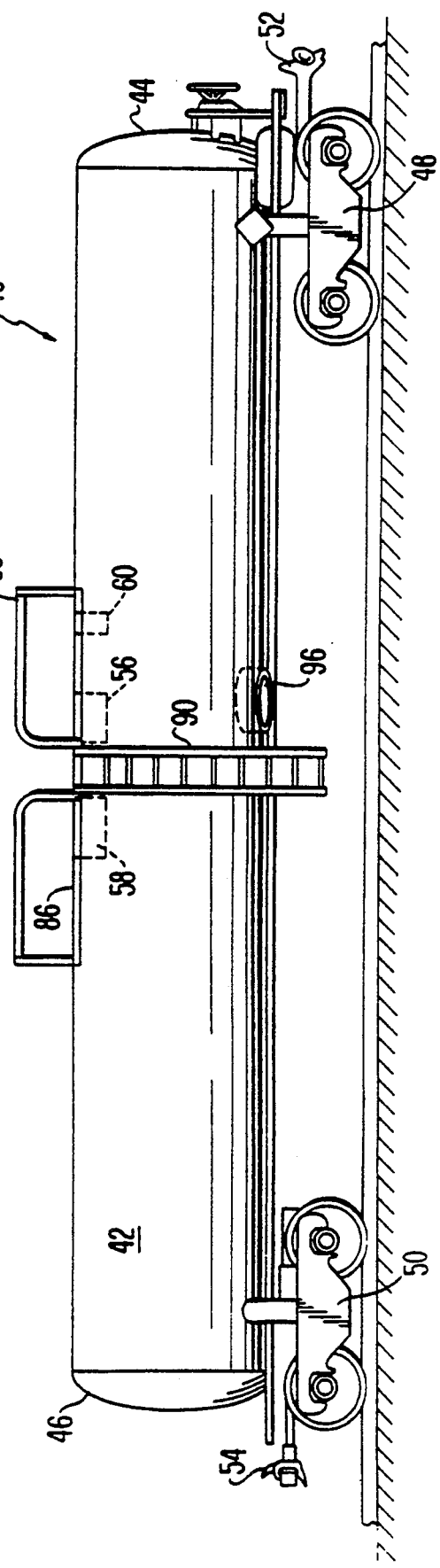

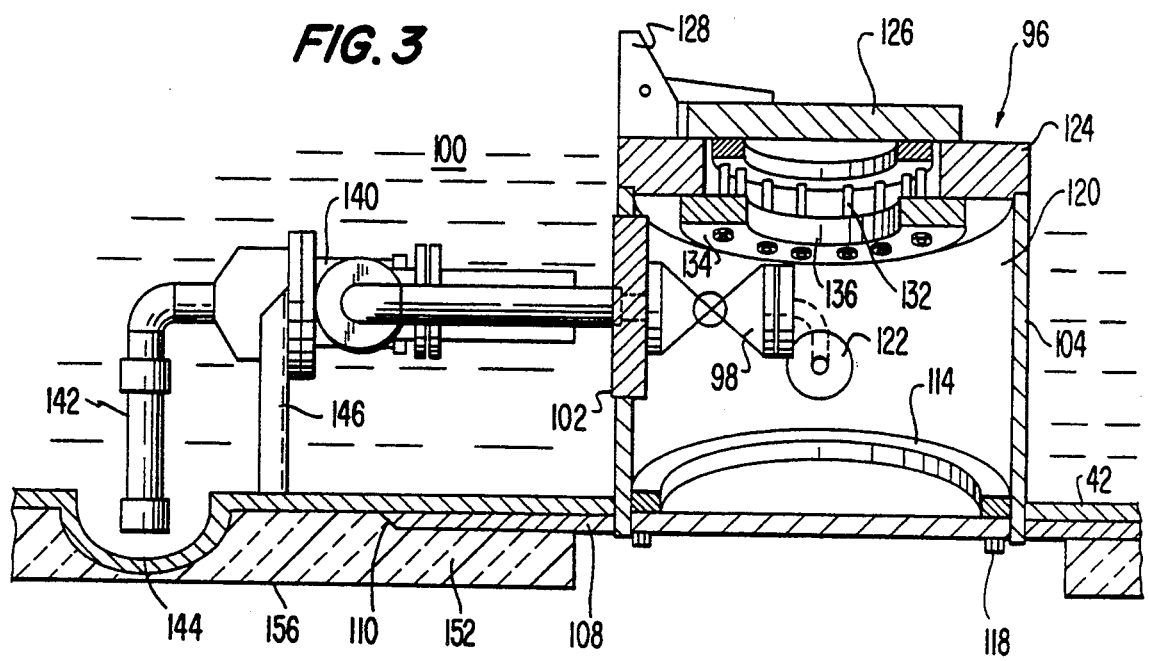
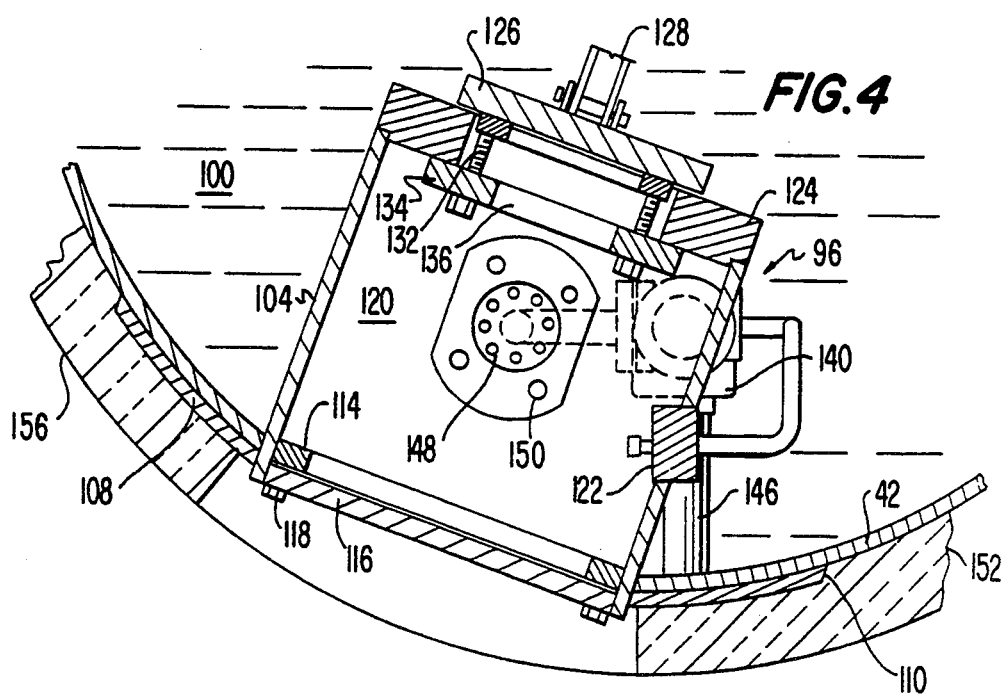

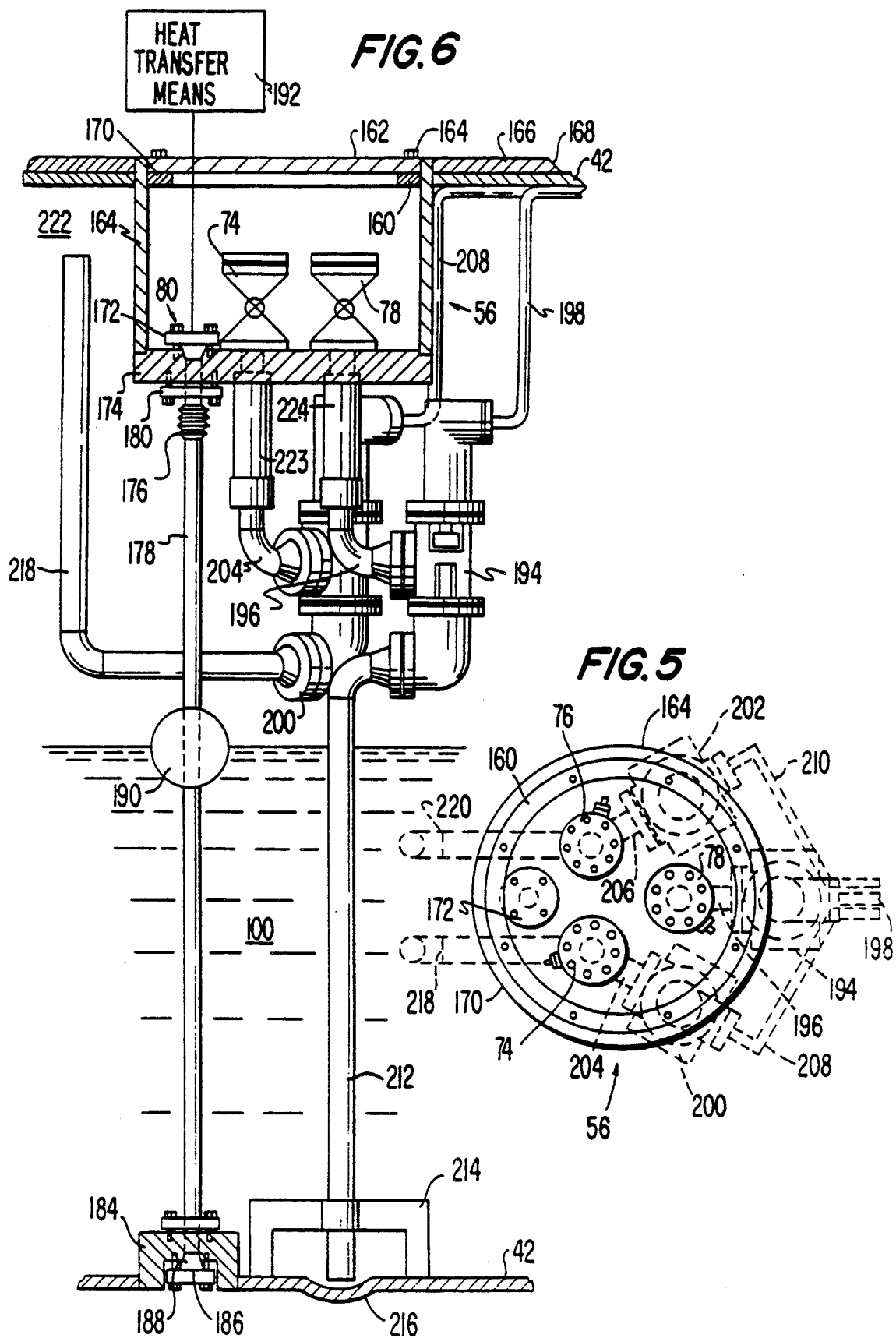

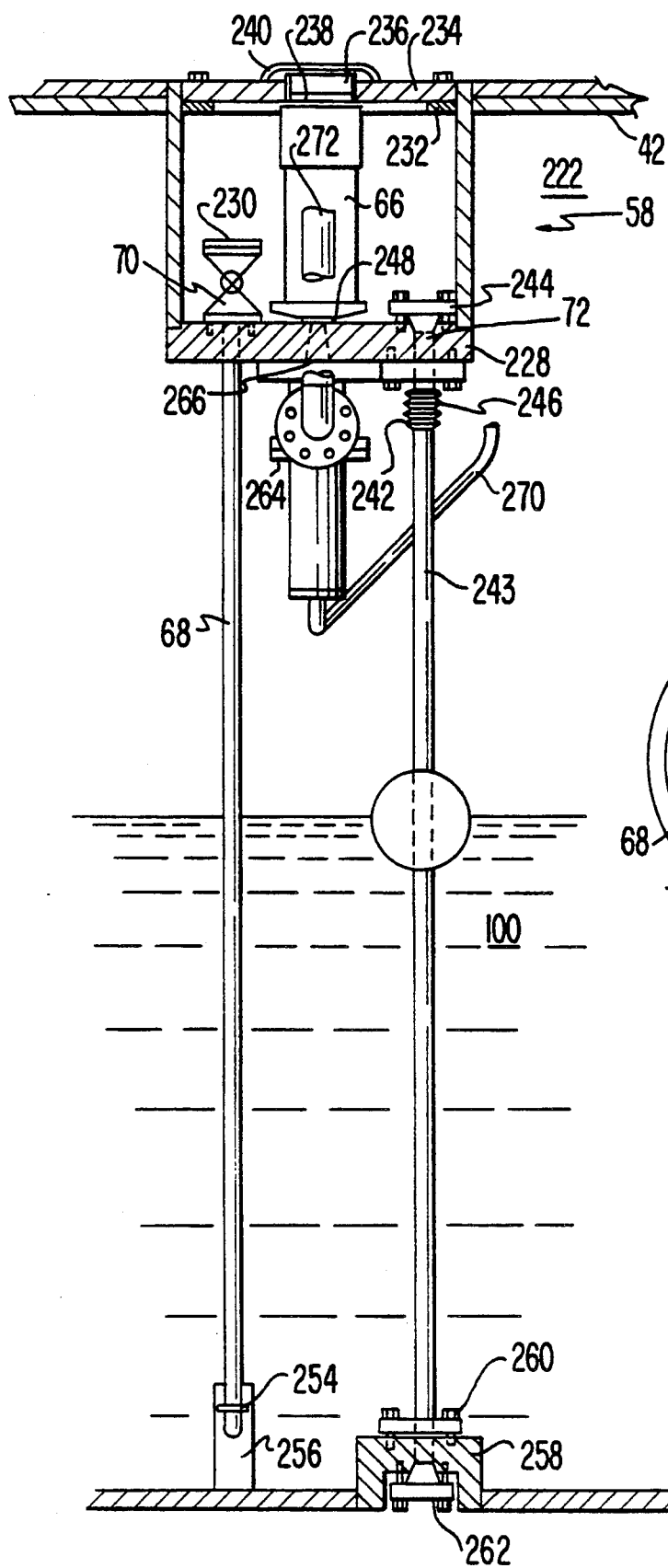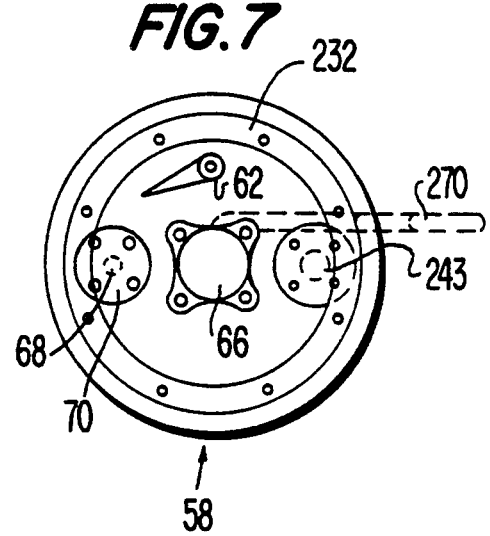

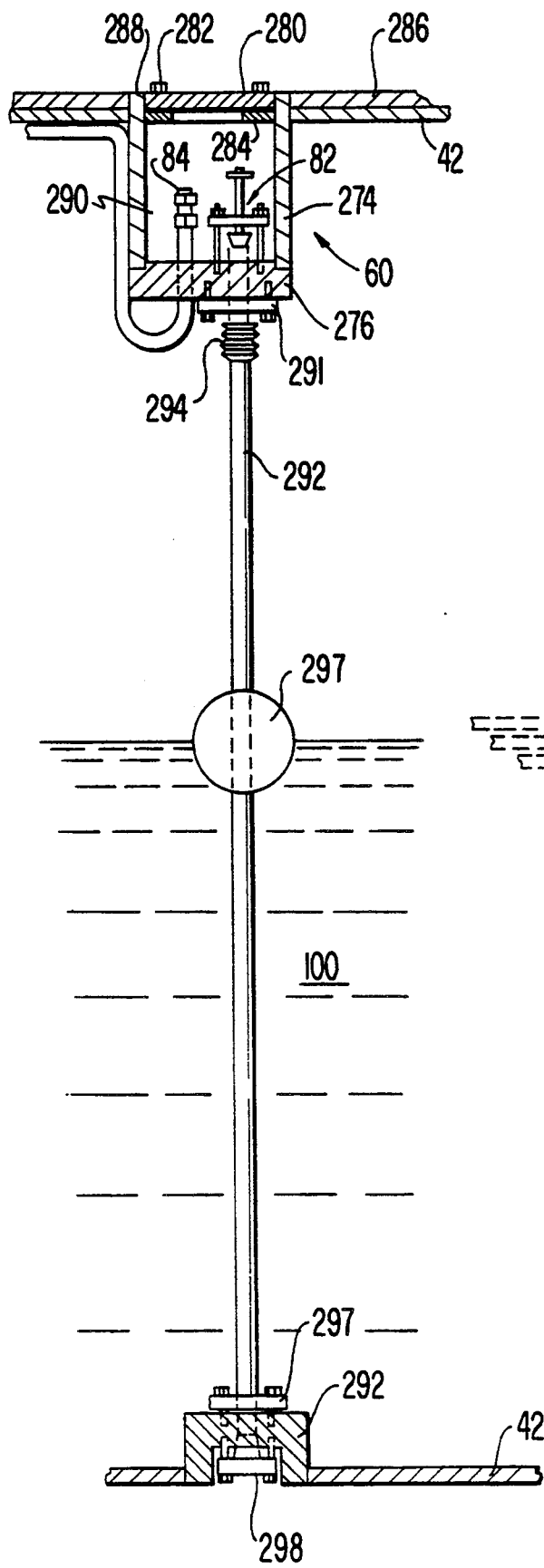
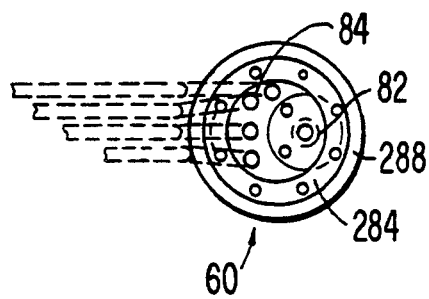

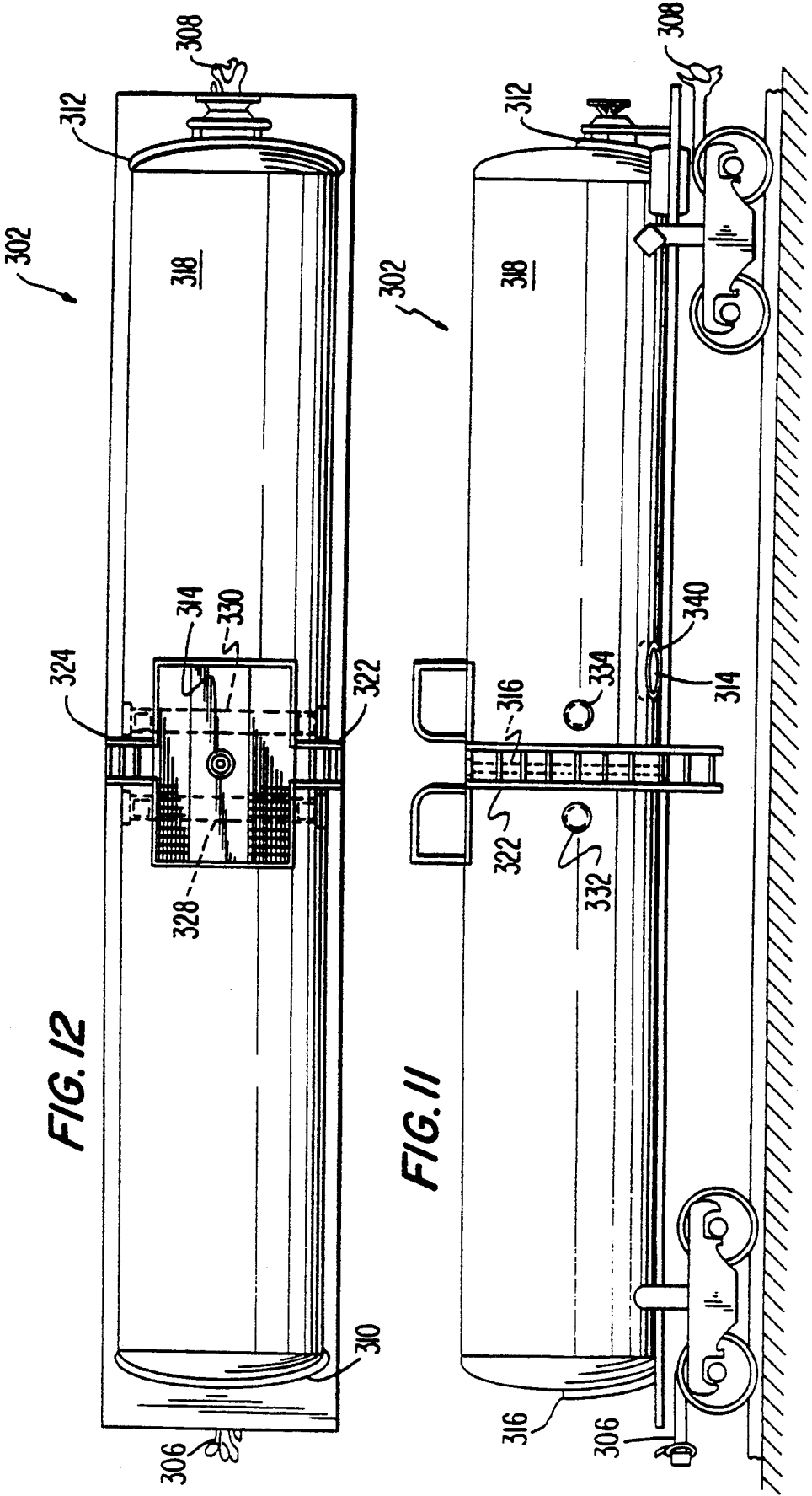

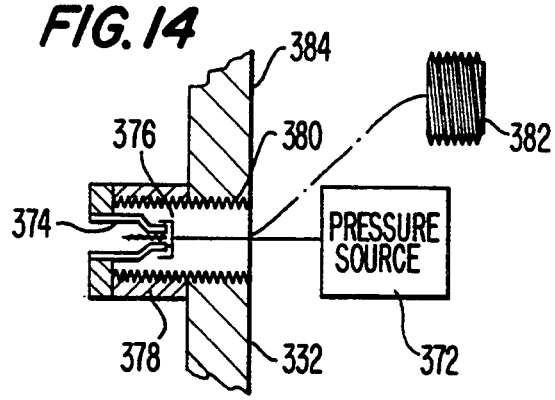
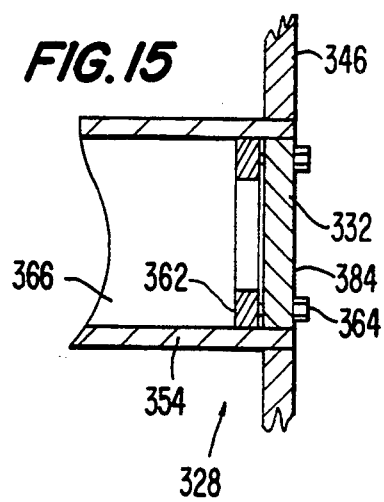
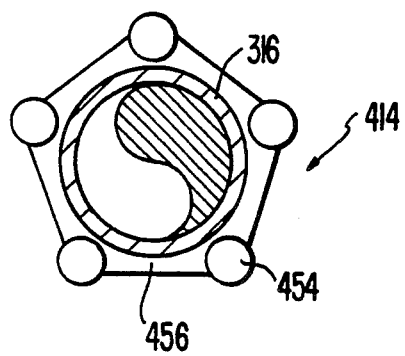
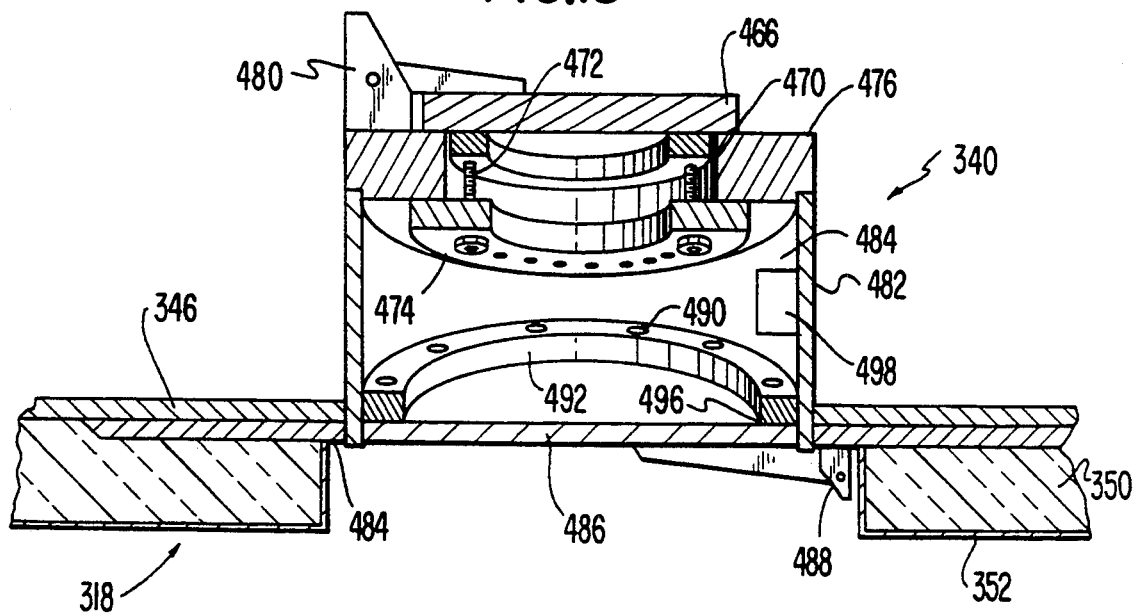

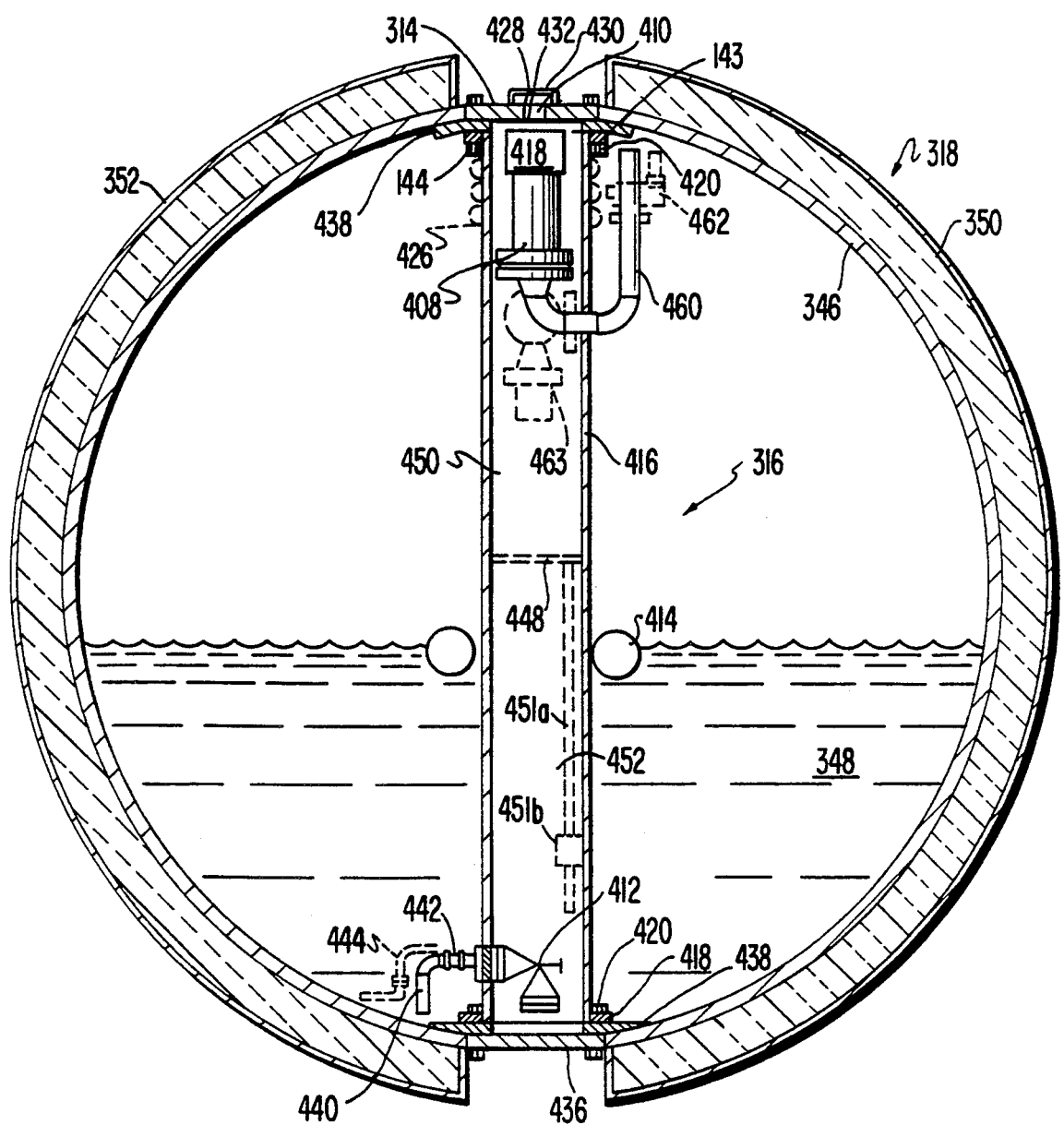

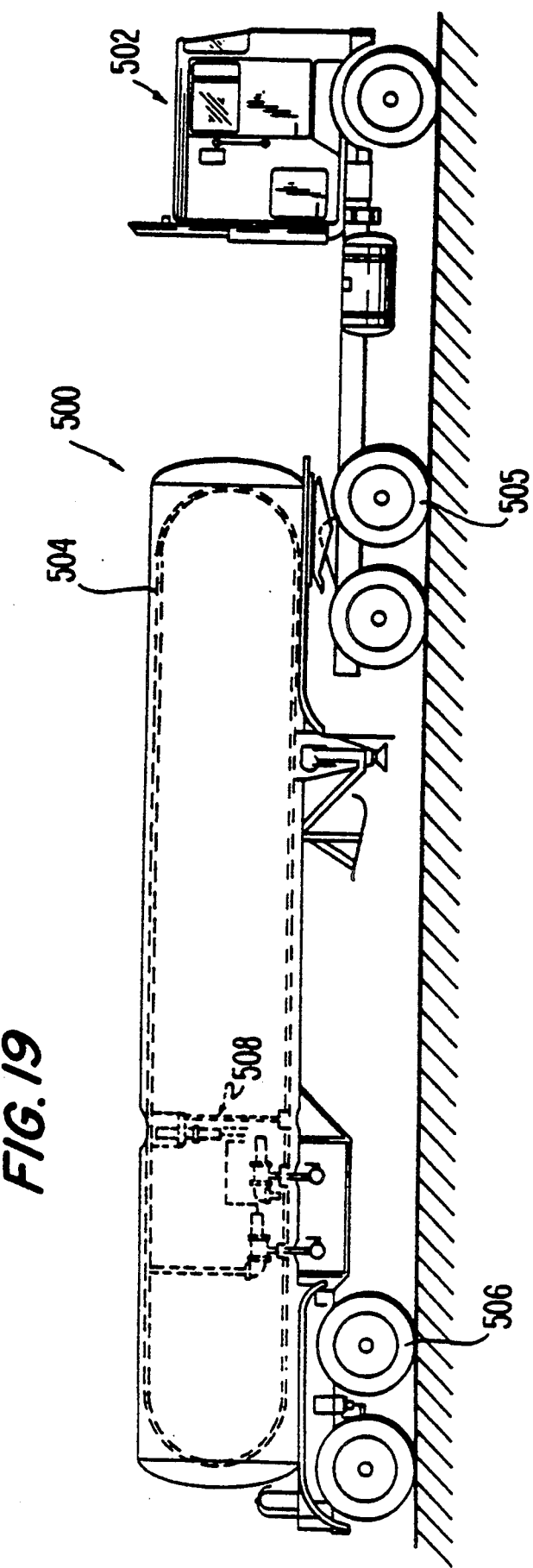

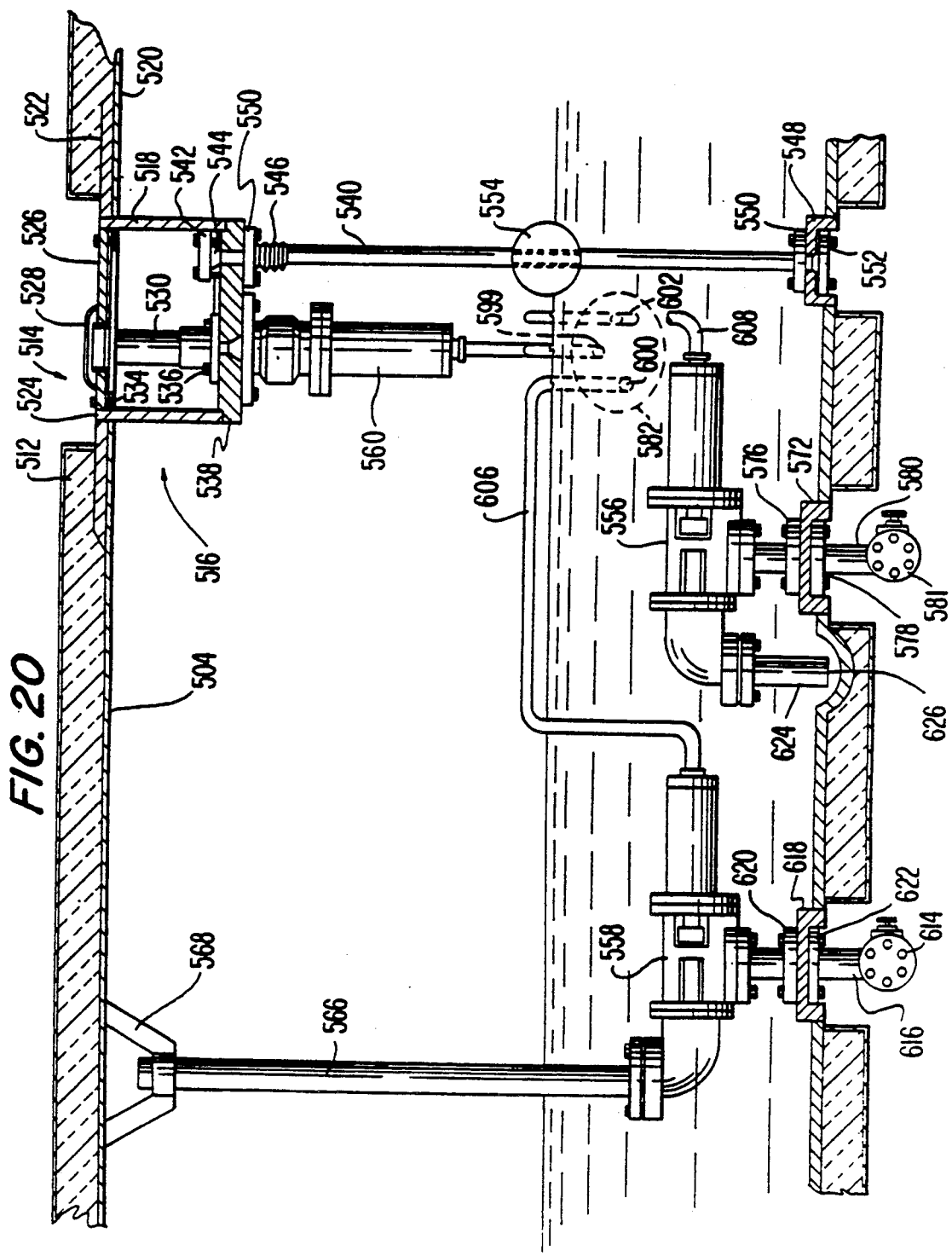

FLUID TRANSPORT APPARATUS WITH SIDE RECESSED FITTING WELL

This is a divisional application of Ser. No. 07/802,699, filed Dec. 5, 1991, now U.S. Pat. No. 5,251,650, which is a continuation application of Ser. No. 07/595,464, filed Oct. 10, 1990, now abandoned.

BACKGROUND OF THE INVENTION

The present invention relates to vessels for storing hazardous, obnoxious, or valuable or sensitive fluid materials. It more particularly relates to vessels for safely transporting and handling such fluid materials.

Society today requires that numerous chemical materials be handled, many of which have hazardous or obnoxious properties. These materials include for example acids, alkalies, chlorine, ammonia, liquefied petroleum gases, hydrogen sulfide, hydrogen cyanide. sulfur dioxide, mercaptans, fuels, pesticides, radioactive materials and industrial wastes. To ensure that these hazardous, obnoxious, or valuable or sensitive materials do not escape into the environment during their processing, storage and transportation, they are contained in strong vessels or piping systems. These vessels must not only provide satisfactory access to the contained materials, but must completely and safely contain them at all times when the escape thereof to the outside environment is undesirable or unsafe. In some cases, it is even desirable to protect the stored material itself from the environment.

The unintentional escape of such substances from their containers can have disastrous consequences, including the loss of life, damage to health or property, public inconvenience and even the evacuation of public areas. Accordingly, there is a strong need to provide safer containment system. Valves with or without mechanical actuators to operate them are used to access the materials stored in the sealed vessels. The containment vessels are typically reliably built. It is the valves thereof and the attachment of the valves which are the weak points in the containment system and thereby reduce the reliability and usefulness of the entire containment system.

In some instances, relatively large leaks or seepages from valves are tolerated by users and by society depending upon the particular location and the state, pressure and properties of the stored materials whether hazardous or non-hazardous. However, in the case of extremely toxic, reactive, obnoxious, valuable and sensitive materials even small failures of containment or seepages can be so objectionable as to discourage or even preclude the handling, transportation or storage of these materials. This problem is growing due to the public's increasing anxiety over the handling of chemical and radioactive materials by both in industry and government. Materials which exist in normal conditions as high pressure or liquefied gases are particularly troublesome, especially if the materials have a foul odor or corrosive properties. Seepages may not even approach hazardous levels before the users of the materials are exposed to adverse publicity, litigation and extremely stringent and costly regulations. When valve systems used with hazardous, obnoxious or valuable materials fail, the release of the materials can have potentially lethal and costly consequences. This failure can result from highway accidents, fires, explosions, earthquakes, storms, misuse, abuse and vandalism.

Nuisance leakages from transportation vessels are characterized by small fugitive emissions from vessels. Such leakages may or may not be inherently hazardous, but when detected they are almost always regarded by the public with great fear and alarm. This can cause great embarrassment and expense to shippers of hazardous materials who often must fly in repair crews to repair or deal with such leaks. Negative publicity and further costly regulation of the shipper's activities may result. The spector of litigation, whether for real or imagined damages, is always present when there has been a leakage.

Nuisance leakages almost always arise from defects or failures of vessel closures to perfect seals. They only very rarely result from plate or welding defects in the vessel itself. Flanged and gasket closures are the most reliable, followed closely in reliability by properly sealed threaded plugs or caps. Both are readily tested for leakage before shipment, and when this is done, seldom seep en route. Both are relatively strong and resist impacts and other abuse. Valves are the principal leaking culprits, since they are relatively complex devices with moving, rubbing and wearing parts and are generally equipped with friction seals on their packing glands. They typically protrude considerably from the vessel and are therefore vulnerable to damage. On the other hand, a vessel without valves is not very useful since one cannot easily gain access to its contents, if they are under pressure.

To protect the protruding vulnerable valves on hazardous material transportation vessels, rigid steel protective domes are typically erected or constructed around the valves. Sometimes excess flow valves are installed inside the vessel. Sometimes a portion of the valve body is installed inside or partly inside the vessel and the activating portion is left outside where it is ready to transfer impact damage to the valve itself. Conventional manway entrances to tank cars and trailers consist of simple hatches or flange systems on protruding, vulnerable nozzles, just as on conventional stationary vessels.

When valve leaks occur in transportation vessels in transit, crews are dispatched generally by airline to attempt "hot" repairs to the leaking pressurized valves. If these repairs fail, a few hazardous materials vessels are equipped to receive "valve safety kits" which are clumsy devices designed to fit over the entire valve and seal (more or less) to the vessel exterior. Since this exterior is often dirty, damaged, corroded or otherwise rough, it is difficult and sometimes impossible to make a good bubble-tight seal to the vessel with these kits. These kits are also difficult to transport, especially on commercial airliners, and are heavy and cumbersome to use.

Catastrophic failure of transportation vessels and especially those carrying pressurized gases or liquids often results when their valves or nozzles are impacted. Conventional valve and fitting designs mounted at least partially outside of the vessel are vulnerable to impact, damage or being shorn off when their vessel is in a wreck. Valves, nozzles and manways of such vessels protruding outwardly from the vessel are vulnerable to flying debris, other vehicles or tank cars, railroad irons, bridge abutments, tunnel walls or overpass supports.

Relief valves of conventional vessels are especially vulnerable since they cannot be protected from impact damage or shearing by ordinary excess flow valves within the vessel. The only protection afforded relief valves is that provided by the protruding valve enclosure or tank dome or similar external structure. If they are equipped with excess flow valves, they cannot then function as relief valves. Further, the fitting domes of conventional vessels protruding from the tanks do not adequately protect the fittings therein or the dome (or manway nozzle) itself.

Conventional containment vessel designs with valves and manhole nozzles do not approach the potential reliability levels of the simple cylindrical or spherical containment vessels shapes to which they are often attached due to the structural compromises made to place the nozzles or valves on the exterior of these vessels. The external nozzles systems thereby are weak points in the containment vessel and compromise and reduce the reliability and usefulness of the entire vessel containment system.

Protruding nozzles are relatively weak structural points subject to shear failure in the event of an impact. Their failure can result in the catastrophic release of the contents of the vessel even though the vessel itself remains essentially intact. On the other hand, a vessel without means of access is essentially useless, and thus valves are needed to add, withdraw and monitor the contents of the vessel. Also, personnel access is often necessary to properly maintain the interior of larger vessels. For tank cars, highway trailers, cylinders and process vessels, these utilitarian purposes have resulted in designs which compromise the inherent strength and impact resistance of the vessels themselves. Thus, today's vessels are often subject to unnecessary breaching when impacted.

Prior art process and transportation vessels have been designed 1) to maximize the ratio of vessel volume to vessel wall volume, 2) to maximize the ratio of vessel pressure rating to vessel wall thickness. 3) to maximize the use of simply formed component shapes such as cylinders and flats and to a lesser extent spheres, hemispheres and ellipsoids, and 4) to maximize the use of standard valves and other piping appliances. Designers have tended to believe that the maximum forces to which the vessel will be exposed are the ordinary forces of static design internal pressure, normal transportation forces, gravitational forces, wind pressure, ambient temperature gradients and the like.

Limitations on the vessels' diameter or width imposed by the necessities of travel along railways and roadways and the ease of construction have resulted in the general use of cylindrical vessels with hemispheric or hemi-ellipsoid heads. These shapes tend to address the first three goals listed above very well. However, in addressing the fourth goal designers have merely added needed valves and appliances in the most obvious manner—by breaching the smooth exterior of the vessels at convenient locations and installing one or more nozzles projecting to the outside. These nozzles normally terminate in a standard flange, to which a valve or other flange can be mated, thereby effectively sealing the vessel. Where the breach is sufficiently large to compromise the integrity of the vessel at its normal thickness, reinforcing bosses are welded to the vessel wall, usually on the exterior. These projecting nozzles typically extend two to twelve inches from the vessel wall surface to provide room for bolting operations and vessel insulation where needed. This method of adding nozzles seriously harms the integrity of the vessel, however, particularly in its ability to withstand random impacts during wrecks, derailments, topplings, explosions and the like. These nozzles themselves, as discontinuities projecting from the surface of their vessel, provide convenient purchase points for impacting objects and are subject to destructive shearing. Furthermore, the resulting location of the attached appliances, such as relief and other valves, indicators and manhole covers, makes these devices vulnerable to impact and fire damage in the event of an accident.

These problems have been partially addressed in the past by one or more of the following design changes:

1. installing internal excess flow valves on certain nozzles to prevent the loss of contents in the event of total shearing off of the external nozzle;

2. machining intentional weak points or break-off points in the nozzles to prevent the transmission of impact stresses from the nozzle piping to the vessel wall;

3. repositioning nozzles on the vessel from locations particularly vulnerable to impact to less vulnerable areas;

4. using supplemental external reinforcement for some of the nozzles;

5. constructing external guards around and over external nozzles and fittings;

6. using specially designed external valves better able to withstand impacts and fire; and 7. using specially designed valves mounted partly internally to reduce exposure to impacts and fire.

All seven of these remedies, while somewhat effective, are only band-aid attempts to remedy flaws inherent in the expediency of attaching unprotected external nozzles to the pressure vessels in the first place. Their drawbacks are discussed below.

First, the installation of internal excess flow valves is only practical on nozzles attached to external valves and not on relief valve nozzles, manholes and the like. Further such devices are only directed to the escape of material at rates in excess of the rated flow of the device. Smaller leaks are therefore unimpeded by excess flow valves, yet smaller leaks resulting from fire or less than total failure of the external valve or nozzle are the most common in accidents.

Second, the purposeful machining of weak points or breakpoints is only useful if there is some other device upstream, such as an excess how valve, which stops the massive flow resulting when the breakpoint is shorn off. Such devices cannot be used on relief valves and manway nozzles.

Third, at the insistence of regulatory bodies, such as the U.S. Department of Transportation (DOT), outlets are generally prohibited in such obviously vulnerable locations on transportation vessels as the bottoms and ends of tank cars carrying flammable gases and liquids. Therefore, the nozzles are moved to the top of the vessel which is an area less likely to suffer impacts. Unfortunately, three problems are thereby created. (1) The unloading of liquefied compressed gases is complicated since the pumping of the liquid requires the lifting of a liquid at its boiling point to the suction of the pump which results in cavitation. This requires cavitation tolerant or high maintenance pumps or pressure unloading which suffers from its own hazards. (2) Even nonboiling liquids must be pressure unloaded with the attendant risk of introducing excessively high pressures or inappropriate (potentially reactive) substances into the vessel during unloading operations. (3) By moving the remaining unloading position to the top of the transportation vessel, the workers involved in unloading and/or loading of these cars must necessarily work at the highest level on the vessel in a stooped position. This can result in worker discomfort, the likelihood of falling accidents, the aggravation of track injuries and working in a location where escape from accidental leakages is most difficult.

Fourth, the principal drawbacks of reinforcements are that the area of possible purchase by an impacting force is increased in proportion to the size of the reinforcement and that the reinforcement adds weight to the vessel. This extra weight ultimately reduces the vessel's effective ability to contain materials, especially in transportation uses where weight is critical.

Fifth, guards are commonly installed around small nozzles and normally take the form of removable heavy caps, as in compressed gas cylinders, or "dome" arrangements as in tank cars and some tank trucks. The domes typically comprise steel cylinders bolted to the vessel, equipped with heavy covers and containing within them the small vessel valves, monitor ports and relief valves. Again, these devices must be massive if they are to deflect a major impact, and this additional weight is a major disadvantage in transportation vessels. These guards also form a discontinuity in the smoothly curved surface of the vessel thereby increasing the likelihood that the dome and its contents will be shorn off following a major impact. As a variation of the fifth solution, guards have been used in some earlier experimental transportation vessels wherein the dome was "inverted" and placed in a recess more or less within the smoothly curved envelope of the vessel.

Listed below are patents which may be relevant to the present invention. The following patents relate to recessed wells in fluid vessels: Kizer U.S. Pat. Nos. 2,006,924, 2,048,454, Davenport U.S. Pat. No. 1,759,734, Trobridge U.S. Pat. No. 2,747,602, Roussie U.S. Pat. No. 1,627,807, Wakefield U.S. Pat. No. 1,933,233, Thwaits U.S. Pat. No. 2,067,993, Dalglish U.S. Pat. No. 2,723,862, Rind U.S. Pat. No. 2,858,136, Merkle U.S. Pat. No. 3,884,255, Mueller U.S. Pat. No. 3,889,701, Schmiermann U.S. Pat. No. 8,081,104 and Arvintz U.S. Pat. No. 2,096,444. The following patents relate to diametric and/or pressurized wells in fluid vessels: Spector U.S. Pat. No. 3,341,215, Arpin, Jr. U.S. Pat. No. 2,548,190, Welcker, U.S. Pat. No. 1,542,116, Howard U.S. Pat. No. 1,442,525, Dees U.S. Pat. No. 715,355, Fisher U.S. Pat. No. 113,153, Asbury U.S. Pat. No. 1,053,344, Folmsbee U.S. Pat. No. 1,699,527, Armstrong U.S. Pat. No. 2,675,794, Ludwig U.S. Pat. No. 3,157,147, Mitchell U.S. Pat. No. 3,658,080, Thompson et al. U.S. Pat. Nos. 3,883,046 and 4,085,865. The following patents relate to rupture discs: Folmsbee et al. U.S. Pat. No. 3,310,197, Carlson U.S. Pat. No. 3,845,878 Adler U.S. Pat. No. 4,183,370, Short, III U.S. Pat. No. 4,553,559, Graves U.S. Pat. No. 4,245,749, Lithgow U.S. Pat. No. 2,092,925, and Samans U.S. Pat. No. 3,109,555. The following patents relate to control valves: Moeller et al. U.S. Pat. No. 1,544,024, Endacott U.S. Pat. No. 1,897,164, De Frees U.S. Pat. No. 2,423,879, Black U.S. Pat. Nos. 3,187,766, 3,310,070, Dale et al. U.S. Pat. No. 3,764,036 and De Frees U.S. Pat. No. 4,009,862. An internal valve assembly is shown in Schwartz U.S. Pat. No. 4,872,640. Related U.S. applications are Ser. No. 07/595,477 filed Oct. 10, 1990, entitled "Fluid Containment Vessel with One or More Recessed Wells, now U.S. Pat. No. 5,222,517 and application Ser. No. 07/750,391 filed Oct. 9, 1990, entitled "Internal Safety Valve and Pump System", now U.S. Pat. No. 5,228,473. The entire contents of each of these patents and applications and any other patents, publications or applications mentioned anywhere in this disclosure are hereby incorporated by reference in their entireties.

SUMMARY OF THE INVENTION

Accordingly, a principal object of the present invention is to provide a practical containment system for hazardous and/or obnoxious materials with improved abilities to withstand catastrophic assaults from external causes such as derailments, wrecks, collisions, fires, explosions and projectile impacts.

Another object of the present invention is to provide a transportation vehicle design whose valves and other fittings are more likely to survive impacts.

A further object of the present invention is to provide a safer containment system suitable for use in transportation by rail, highway, air or water and for the storage and processing of fluid materials where the escape of such materials following an accident could be catastrophic.

A still further object of the present invention is to provide a safer fluid containment vessel, such as a tank car, tank trailer, tank truck, cylinder, storage vessel or process vessel.

Another object is to provide a safety system for transportation and stationary vessels whose fittings can be easily, safely and comfortably serviced.

A further object is to provide a safety vessel system which is easy and relatively inexpensive to construct, maintain and operate and is generally adaptable to retrofit on a large number of existing rail and highway vessels.

A still further object is to provide a hazardous commodity transport vessel which is less vulnerable to vandalism.

Another object is to provide an improved hazardous fluid containment vessel which is safer to personnel working on the fittings thereof.

The present invention as discussed in detail below addresses the above-mentioned objects in a novel synthesis of designs to take advantage of the natural strength and impact resistance of smoothly-curved vessel walls, while preserving the ability to add, withdraw and monitor the vessel contents, as well as the ability to enter the vessel. The invention thereby actually improves the utility and safety of the vessel, particularly for transportation vessels.

Directed to achieving these objects, improved safety vessel systems for transportation vessels and/or stationary vessels are herein disclosed. The pressure vessel is constructed of puncture resistant material, preferably metal, using the basic shapes of the cylinder, spheroid and ellipsoid, and constructed so that no significant nozzles, bosses, flanges or other appurtenances extend beyond the basic smoothly-curved external surface of the vessel. The vessel itself is formed such that its exterior is also free of significant surface discontinuities, sharp angles, wells, protrusions and small radii bends which could serve as purchase points for impacting objects or forces. The exterior surface of this safety vessel system, unconnected from piping systems, is thereby configured so that the vessel will freely roll or tumble, if moving, and will naturally tend to deflect and redirect away from itself projectiles hitting its curved surfaces.

This safety vessel system is mounted on its foundation or truck in such a way that no concentrated force of sufficient magnitude to tear or puncture the wall of the vessel can be transmitted from the mount of the vessel to the vessel. Rather, the mount is designed to break or tear away or otherwise separate from the vessel wall before any such force exceeds fifty percent of the allowable stress on the vessel wall. This is accomplished by using banding or pad plates to spread out the force, shear scoring of the mounting hardware to allow the separation at predictable points, and/or the use of lighter strength material or shapes in the mounting hardware than in the vessel wall at the attachment points. The connections of the safety vessel system to the necessary piping for the transfer of fluid to or from the system are configured similarly with suitable break points designed into the attaching piping to prevent the transmission of excessive stress to the attachment points on the safety vessel system. All points of piping connection to the system, preferably including nozzles equipped with pressure relief valves, are protected by suitable internal valves.

Certain variations of this invention, however, allow for the use of conventional valves provided that they are mounted internally, that is, mounted completely within the protective envelope formed by the vessel walls. Preferably all lines connected to the safety vessel system are also externally equipped with valving such that the piping cannot discharge to the environment if the external piping breaks at the designated break points mentioned above. Preferably, all piping nozzles on this system other than those attached to pressure relief valves are also equipped with suitable internal excess flow valves. Further, all piping nozzles on the system can be equipped with valving which is remotely controllable from outside the pressurized portion of the system, and which is of the fall closed configuration, except for the pressure relief valve nozzles which should be equipped with internal fail open valving.

The present safety vessel system includes recessed wells or compartments attached to the vessel wall and projecting entirely within the vessel. These wells can contain ports for attachment of instruments, piping, valves, relief valves, controls or manholes for gaining personnel access to the interior of the vessel. Where these wells are provided, they are covered with flush-fitting cover plates having thicknesses and strengths not less than that of the vessel wall and formed such that the continuity of the external wall of the vessel is not significantly broken. The well cover plate or flanges are configured to present no significant purchase points for impacting forces.

The wells preferably provide for pressurization from the outside, when they are closed, to a pressure not less than the working pressure of the safety vessel system. This not only eliminates potential nuisance leakage and the need for specialized valve capping kits, but also contributes to the impact resistance of the system.

Manholes, if provided for access by personnel to the interior of the vessel, are located fully within the wells. The manholes are preferably constructed so that their sealing flanges tend to be tightly closed by the internal pressure of the fluid in the system. In this manner, no port on the system need depend entirely upon the integrity of the highly stressed bolting materials for closure.

The ports of any internal valves which are not themselves installed within the wells, as described above, are protected by flush mounting flanges and fasteners, fall closed valves and preferably excess flow valves.

This system when used on transportation vessels can include special protection systems to control "water hammer" hyper-pressurization of the vessel during high speed impacts.

As to transportation vessels, means for insuring that the internal valves are in their appropriate fail open or closed position and/or that their cover plates are securely secured properly when the system is not connected to an unloading system can be provided.

Submerged wells with cover plates or other compartments containing basic tools and specialized safety equipment needed by trained emergency crews to handle wrecks, leaks and fires can also be provided.

These systems are also appropriately protected from impact and fire by usual conventional systems. As to rail tank cars these systems can have:

1. adequate shell thickness for the vessel, preferably not less than one inch thickness of steel, and/or the use of head shield protection;
2. full shelf couplers;
3. insulation or lagging to protect the vessel from high or low ambient temperatures;
4. high temperature thermal barriers on the exterior of the vessel and all cover plates to the wells;
5. adequately-sized pressure relief valves; and
6. appropriate labeling, marking and placarding.

Other objects and advantages of the present invention will become more apparent to those persons having ordinary skill in the art to which the present invention pertains from the foregoing description taken in conjunction with the accompanying drawings.

BRIEF DESCRIPTION OF THE DRAWINGS

FIG. 1 is a side elevational view of a first rail car of the present invention.

FIG. 2 is a top plan view of the rail car of FIG. 1.

FIG. 3 is an enlarged side cross-sectional view of a bottom recessed area of the tank car of FIG. 1.

FIG. 4 is an end cross-sectional view of the bottom recessed area of FIG. 3.

FIG. 5 is an enlarged top plan view of the fluid valve well of the rail car of FIG. 1.

FIG. 6 is a side elevational view of the well of FIG. 5.

FIG. 7 is an enlarged top plan view of the relief valve well of the rail car of FIG. 1.

FIG. 8 is a side elevational view of the well of FIG. 7.

FIG. 9 is an enlarged top plan view of the valve control well of the rail car of FIG. 1.

FIG. 10 is a side elevational view of the well of FIG. 9.

FIG. 11 is a side elevational view of a second rail car of the present invention.

FIG. 12 is a top plan view of the rail car of FIG. 11.

FIG. 14 is an enlarged cross-sectional view of a pressure fitting of FIG. 13.

FIG. 15 is an enlarged cross-sectional view of a portion of the cover plate of FIG. 13.

FIG. 16 is an enlarged side cross-sectional view of a relief valve well of the rail car of FIG. 11.

FIG. 17 is an enlarged top plan view of the magnetic floating ring of the well of FIG. 16.

FIG. 18 is an enlarged cross-sectional view of the bottom recessed area of the railcar of FIG. 11.

FIG. 19 is a side elevational view of a compressed gas safety transport tank of the present invention.

FIG. 20 is an enlarged side elevational view of the mechanical arrangement within the tank of FIG. 19.

DETAILED DESCRIPTION OF PREFERRED EMBODIMENTS OF THE INVENTION

Figure 13:
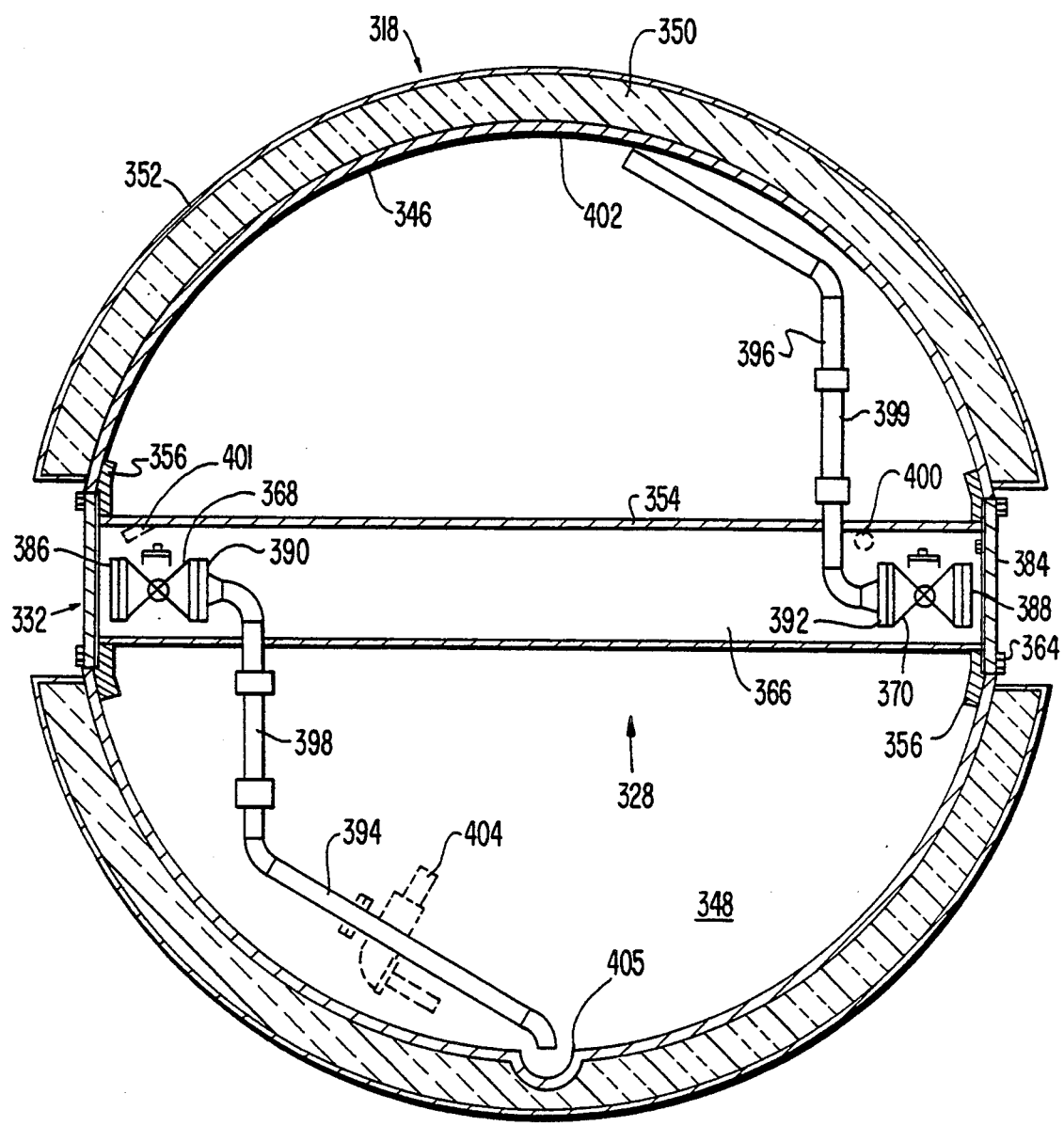
FIG. 13 is an enlarged cross-sectional view of one of the two liquid vapor valve tube wells of the rail car of FIG. 11.

A first system of the present invention shown provided in a railroad tank car is illustrated in FIGS. 1 and 2 generally at 40. The railroad tank car 40 consists of an elongated tank 42 cylindrically shaped with elliptical or hemispherical ends or heads 44, 46. The tank 42 is supported on conventional rail wheel assemblies 48, 50 and full shelf couplers 52, 54 are employed at both ends of the car. Insulation and external insulation jackets are not shown in FIGS. 1 and 2 for ease of explanation, but are illustrated in many of the other figures and discussed later. This system includes three submerged wells—a fluid valve well 56, a relief valve well 58, and a valve control well 60—spaced longitudinally on the top center area of the tank 42 as shown in FIG. 2.

These three wells 56, 58, 60 are shown in simplified side elevation in FIG. 1. More particularly, they are shown to be positioned at the top of the tank 42 and recessed into the interior thereof and flush at their tops with the envelope of the tank. All of the wells, as will be discussed in greater detail later, are constructed to receive flush mounting cover plates when not in use and when in transit. The plates are preferably constructed, fastened and gasketed so that the interior of the wells can be pressurized during shipment or at other appropriate times.

The relief valve well 58 is shown in detail in FIGS. 7 and 8. This well contains a (one-half inch) pressure gauge with a (one-half inch) pressure gauge shut-off valve 62 connected thereto, a (four-hundred and fifty pound) safety relief valve 66, a (one inch) thermometer well 68, a thermometer well shut-off valve 70 and a (one and a half inch) water drain 72. The fluid valve well 56, which is shown in FIGS. 5 and 6, contains two vapor valves 74 and 76 flanged to the bottom of the well, a liquid valve 78 also flanged to the bottom of the well, a water drain 80, and ample space on the bottom of the well to allow for the ease of installation and operation of the valves and any associated capping kits. The valve control well 60 is shown in detail in FIGS. 9 and 10. This well contains a water drain 82, hydraulic, electric or pneumatic quick connectors 84 for the remote operation of shut-off valves and other controls (not shown), if desired.

As shown in FIGS. 1 and 2, a work platform 86 and a handrail 88 for it at the top of the car provide a working area which can be accessed by either of two ladders 90, 92 secured on opposite sides of the car. The central upper work surface as shown at 94 in FIG. 2 has a non-skid finish or grating.

Since these three wells 58, 56, 60 are submerged into the tank 42 in the upper half thereof, they are provided with water drains 72, 80, 82, respectively, to allow for the automatic removal therefrom of rain, snow melt, product spillage and wash water, which might otherwise accumulate in the wells when they are open. Wells located in the lower haft of the tank 42 need not, however, be equipped with such drains since any liquid in them would flow out of them naturally. Special care must be taken in the design of these drains to allow for the tank stress relief, corrosion resistance, proper drainage, and the ability to seal the drains during shipment or in the event of drain leakage. These drains can be conveniently designed to function as part of a magnetically-coupled liquid level detection system and/or to perform heating functions if desired as will be described in greater detail later.

Referring to FIGS. 3 and 4, a bottom well 96 near the bottom of the tank 42 is recessed into the interior the tank. This bottom well 96 allows for a true bottom outlet for the car and true gravity drainage, which is a distinct advantage in unloading liquefied gases into storage tanks (not shown). It also provides a convenient location for a manway opening (discussed later) to allow access to the interior of the vessel. Although locating the manway access at the bottom of the car is a convenient position, it can be located elsewhere on the car as well. This bottom well 96, which is shown in detail in FIGS. 3 and 4, is equipped with a conventional external shut-off valve 98 internal to the well and vessel system but external to the fluid product compartment 100 of the tank 42. A boss 102 welded to the well wall 104 provides a convenient machinable surface for mounting the valve 98 by means of studs threaded into drilled and tapped holes in the boss. The boss 102 can also be machined, drilled and tapped to provide a convenient mounting surface for an optional valve capping kit if desired. The valve 98 need not be mounted, however, by bolting to the boss 102, as a conventional nozzle with flange can be used provided that the valve can be totally capped and is totally inside of the well.

The well wall 104 is cylindrical and has sufficient thickness to withstand the maximum working pressure of the vessel applied from interior compartment 100. It is welded to the outer wall of the tank 42 without protruding significantly out from it. The outer wall of the tank 42 is reinforced by reinforcing pad 108 around the circumference of the well. The peripheral circumference edges 110 of the pad 108, if located externally, are bevelled to minimize the purchase points for any impacting forces.

A bolting ring 114 with optional gasket surfaces is attached to the circumference of the inner surface of the well wall 104 as by welding. The ring is positioned so that when the external cover plate 116 for the bottom well 96 is bolted by bolts 118 properly in place the cover plate fits flush with the exterior surface of the car 40. The cover plate 116 is of at least the same strength and thickness as the wall of the tank 42. Preferably it is rolled to the same curvature as the tank 42 and machined on its inner surface to accept a gasket to allow for the sealing of the entire interior compartment 120 of the well 96. The cover plate 116 is held to the bolting ring 114 by bolts 118 threaded into suitable drilled and tapped holes in the bolting ring. The cover plate 116 is attached to the tank 42 by a suitable breakaway mounted hinge such that the cover plate, which typically weighs a couple hundred pounds, can be easily swung open or closed by a single workman using a winch and cable system (not shown) or hydraulic system (not shown) mounted to the vessel jacket. The cover plate 116 can also be equipped with a flush mounted, quick connect valve, such as a Schraeder valve, to allow the interior of the well compartment 120 to be pressurized.

The well wall 104 can also include a boss 122 through which one or more control lines for internal equipment, such as internal valves, penetrate. A well head or end plate 124 is positioned at the end of the well opposite from the cover plate 116. The end plate 124 is of sufficient thickness and/or curvature to withstand the internal pressure of the tank 42 and to support the manway cover 126 without significant deflection when the tank 42 is pressurized. The well end plate 124 need not be flat as shown, but can be elliptical or spherical. The manway cover 126 is preferably elliptically or oblong shaped so that it can be easily removed through a mating elliptical hole in the well head. The cover 126 is hingedly mounted by hinge 128 to the tank. The cover 126 and the mating surface of the manhole in the well head 124 are machined to accept a suitable resilient gasket, such as one formed of "Gylon" when the transported fluid material is liquefied hydrogen sulfide.

Equally spaced bolts 132 are threaded into a series of equally spaced, drilled and tapped blind holes in the manway cover 126 and also pass through removable bolting ring 134 which seats against the exterior side of the well head 124. This arrangement securely holds the cover 126 in place against its gasket and seat area regardless of the pressure within the well compartment 120 or the fluid product compartment 100. Leak checking can easily and accurately be done through the large opening 136 in the center of the bolting ring 134. Corrective bolting stress adjustment can be made around the entire circumference of the manway gasket to assure an easy, tight seal, similar to a conventional flange. However, unlike a conventional flange, the manway cover 126 tends to be pressed tightly into place as the pressure in the fluid product compartment 100 rises. Unlike a conventional boiler manway-with-yoke, the present manway can be easily and selectively tightened around its entire circumference thereby eliminating the seepage problems typically associated with boiler closures.

An internal valve and actuator 140 on the inside of the fluid product compartment 100 is attached to boss 102 and connected to a flow passage through the boss 102 to the valve 98, as shown in FIGS. 3 and 4. Internal valve and actuator 140 is externally controlled by means of a port passing through the well wall 104 at boss 122. Since this is a liquid eduction bottom outlet port, the valve 98 is configured to be fail closed. An internal excess flow valve 142 is attached to internal valve 140 so that in the event of failure of the external piping during unloading, for example, the flow through the valve port will stop. An optional sump, as shown in FIG. 3 at 144, collects the liquid at the bottom of the fluid product compartment 100, and for purposes of illustration the depth of the sump 144 is shown exaggerated in this figure. Its depth is carefully controlled so that no significant discontinuity is thereby formed on the exterior vessel surface. A support structure 146 supports the internal valve and actuator 140, the internal excess flow valve 142 and associated internal piping.

As is apparent from FIG. 4, the bottom well 96 is oriented so that it projects into the tank interior at an angle of approximately twenty degrees off of the vertical center line of the tank 42. This allows the liquid contents of the tank 42 to move freely around the well to the outlet, so that the tank can be drained completely. As is also apparent from this figure, blind holes 148 are drilled and tapped into the boss 122 to accept fasteners for the mounting of the conventional valve 98 inside the well, and (four) holes 150 are provided for the mounting of an optional valve capping kit or "bonnet".

External fiber glass tank insulation 152 covers the shell of the tank 42 and circumferential reinforcing pad 108. The external tank insulation 152 is covered with an insulation metallic (carbon steel) jacket 156 suitably coated with a corrosion resistant paint. If the insulation system does not in itself provide required temperature protection from fires as may occur following a wreck, then a suitable supplemental high temperature coating can be applied, preferably under the insulation jacket. This high temperature coating can be a three-sixteenth inch thick "Thermo-Lag," for example.

The internal configuration of fluid valve well 56 and its connected mechanisms and pipings is shown in elevation in FIG. 6 and in plan view in FIG. 5. It is seen therein that the external vapor valves 74 and 76 and the external liquid valve 78 are arranged in an equilateral triangular relation to allow for maximum spacing between the valves and for access to them. It is also within the scope of this invention to provide for blind, drilled, tapped holes to accept bolts for removably securing valve capping kits within the well 56. A support ring 160 with blind, drilled, tapped bolt holes and preferably a gasket surface is recessed into the well 56, similar to bolting ring 114 illustrated in FIGS. 3 and 4. This ring 160 is positioned so that the cover 162, when bolted into place by bolts 164, is flush with the exterior surface of the vessel.

Although the well side wall 164 is preferably cylindrical, other convenient shapes can also be used. The side wall 164 is attached flush to the outer vessel wall itself without any significant protrusion beyond it. The outer vessel wall can also be reinforced by a circumferential reinforcing pad 166 whose outside edges 168, if located externally, are similarly beveled. The shell of the well wall 164 extends up through the tank 42 and the reinforcing pad 166 to be generally flush with the reinforcing pad and to thereby define a rim 170 disposed about the recessed cover 162. This rim 170 about the recessed cover 162 has a diameter of about twenty-four inches. The inside surfaces of the well wall(s) 164 and bottom of the well are also preferably laminated with stainless steel to retard corrosion.

The inlet to the water drain 80 is equipped for the mounting of a (one and a half inch, three hundred pound) blind flange 172 and/or a plug by means of several drilled and tapped blind holes in the head 174. The water drain 80 passes through a passage through the well head 174. The water drain is removably attached to the other side of the head 174, and it includes a (one and a half inch) stainless steel tube 178, an expansion stainless steel bellows 176, a stainless steel inlet flange 180 and a stainless steel outlet flange welded into a continuous assembly as shown in FIG. 6. The drain tube is preferably gasketed and removably bolted inside of the tank between the well head 174 and the boss 184 at the bottom of the car.

The boss 184 on the outside surface of the car is equipped to have a flange 186 and/or plug 188 installed to seal the bottom of the drain, if desired. The flange 186 mounts flush with the surface of the vessel. However, even if it is not mounted flush, the mere fact that the flange 186 has been shorn off does nor by itself result in a loss of any of the contents of the tank 42 as can be appreciated.

The water drain 80 provides convenient support structure for a magnetically-coupled level indicating device. This device can comprise a stainless-steel ball float, as is available from Midland Manufacturing and as shown at 190 in FIG. 6, sliding freely up and down the drain tube 178 and riding on the liquid level in the tank. The float 190 includes a permanent magnet and the magnetic field therefrom passes freely through the stainless steel drain tube 178 and couples with a magnet attached to a gauging tube (not shown) or is otherwise detected. This detection allows the user to determine from outside of the vessel 40 the location of the liquid/vapor interface inside of the vessel.

The water drain 80 also provides a convenient means of transferring heat to or from the fluid within the tank to change the pressure or temperature therein for processing purposes. A suitable heating or cooling fluid from a "heat" transfer means, as shown generically and schematically at 192 in FIG. 6, can be circulated through the drain tube 178 to accomplish this result. When the tank cars of the present invention are used as storage vessels for liquefied compressed gases, this heat transferring means can be especially useful.

In a preferred embodiment an internally mounted, remotely controlled (liquid) valve and actuator 194 is positioned in the liquid eduction line 196 from the external liquid valve 78. This valve 194, when remotely controlled through control line 198 from valve control well 60, provides for the remote safety shutoff of flow to the external liquid valve 78. In this embodiment internally mounted, remotely controllable (vapor) valves and actuators 200 and 202 are similarly provided on vapor eduction lines 204 and 206 for the external vapor valves 74 and 76, respectively. Control lines 208 and 210 for the vapor valves 74 and 76, respectively, pass through the fluid compartment to the control well 60. A dip leg 212 in the liquid eduction line 196 is held in a bottom anchor slip-fit sleeve 214 secured to the tank shell and over the sump 216 at the bottom of the car. Riser sections 218 and 220 extend from the vapor eduction lines 204 and 206, respectively, to the upper vapor space 222 in the tank. Excess flow valves 223, 224, such as excess flow check valves available from Midland Manufacturing, are provided in each of the eduction lines mounted to the product side of the well head.

The relief valve well 58 and its internal configuration are shown in elevation in FIG. 8 and in top plan view in FIG. 7. The pressure relief valve 66, the pressure gauge connection and shut-off valve 62, the thermometer well shutoff valve 70, the thermometer well 68, and the water drain 72 are shown in well 58, mounted on well head 228 at the bottom of the well. Also shown and mounted is a closure flange 230 comprising a blind flange at the outlet of the thermometer well shutoff valve 70. Each of these elements is fully contained in the well 58 and fully within the envelope of the tank car pressure vessel.

The bolting support ring 232 for the flush mounting cover plate 234 is positioned near the top of the well 58. This ring and plate are preferably gasketed to provide a tight seal and are analogous to the rings and well covers of other wells previously described, except that there is a full-sized port 236 through the cover plate 234. The port 236 allows for pressure to escape should the pressure relief valve 66 lift. The port 236 is preferably equipped with a low-pressure rupture disc and holder 238 mounted below a blow-away rain cover 240. In conjunction with the rupture disc and holder 238, a sealed compartment can be provided for the relief valve during periods when access is not needed. Trace leakage, if any, from the relief valve assembly into this sealed compartment can be absorbed, in the case of many chemicals, by a simple absorbent system. In the event of a major pressure buildup in the compartment, however, the rupture disc 238 opens, allowing the free operation of the pressure relief valve 66. The rupture disc 238 in the cover 240 therefore deters nuisance leakage en route to keep the compartment free of dirt, water and so forth.

The (one thousand psi) bellows expansion joint 242 is positioned at the top of the drain tube 243 and the upper section of the drain above this joint passes through upper and lower blind flanges 244 and 246 bolted to the opposite sides of the well head. A rupture disc 248 positioned below the (four hundred and fifty pound) relief valve 66 at the well head 228 and above the relief valve port 266 communicates with the internal tank safety shutoff valve 264.

Any water accumulation in the well 58 can be drained away by water drain port 72 in a fashion similar to that of the other wells if the well is not to be operated as a sealed system. This water drain is analogous to the water drain in wells described with respect to FIGS. 5 and 6. A closure system is provided for both the water drain port 72 and the thermometer well 68 such that they can be closed off in the event of small leakage through their respective tubes. In the case of the thermo well 68, this is done with the shut-off valve 70 since the valve will be fully within the well. Any valve applied to the bottom outlet of the water drain port 72 and projecting beyond the envelope of the car should be applied using bolts designed to easily break off in the event of impact to protect the integrity of the vessel. Both the water drain tube 243 and the thermo well 68 can be made in one piece with the car or tank 42, as is shown for the thermo well which is welded in place or, preferably manufactured as flanged units to be bolted onto the interior of the car, as is shown for the water drain tube 243. This flanged separable construction of tube 243 (and well 68) allows the units to be of metallurgy dissimilar to that of the car without any resulting welding problems. They can also be readily replaced if damaged without having to weld onto the vessel. The (one inch) thermo well 68 is slip fit into a sleeve 254 secured to a bottom anchor 256 mounted to the tank shell.

A boss 258 secured at an opening in the bottom of the tank shell is drilled and tapped so that a (two inch, three hundred pound) blind flange 260 can be bolted at the top and a (one inch, three hundred pound) blind flange 262 bolted at the bottom with the (one inch Schedule eighty pipe) drain tube 243 passing therethrough.

A remotely controlled valve and actuator 264 of the normally open configuration is preferably mounted in the interior of the vessel and connected to the relief valve port 266 through the well head 228. This remotely controlled valve 264 allows for the emergency shutoff of the relief valve 66 from the valve control well 60 by means of a control line 270 passing through the vessel interior. Field crews can thus change out a defective relief valve on the railroad or at a customer plant without the vessel being depressurized, and this thereby is a significant improvement in the art. FIG. 8 also shows the (two inch) riser pipe 272 to the vapor area 222.

The valve control well 60 is shown in detail in FIGS. 9 and 10. The function of this well is not for the discharge of tank contents but rather as a protective remote housing for the controls and possibly the instruments of the car 40. Its construction is essentially the same as that of the other top mounted wells 56 and 58. It consists of a cylindrical compartment wall 274 beginning flush with the external vessel wall 42 and projecting inwardly and with a bottom head 276. The water drain 82 and several control lines from the internal remotely mounted valves on the liquid and vapor eduction lines and on the pressure relief valves are mounted on the bottom head 276. A heavy cover plate 280 is secured by bolts 282 to a gasket and to a bolting ring 284 and mounted flush with the vessel. Similarly, the shell or wall 274 of the control well 60 extends up past the tank shell and up to be generally flush with the upper surface of the reinforcing pad 286. The upper surface of the wall then defines a rim 288 around the recessed coverplate 280 and having a diameter of about twelve inches.

The hydraulic, electric or pneumatic pressure conducting tubing for the internal safety shutoff vapor and liquid valves passes from the interior of the vessel tank through the bottom head 276 and up into the compartment 290 of the control well 60 where the hydraulic or pneumatic quick connector 84 is provided at its end.

The enclosed compartment 290 formed by the control well 60 can be easily arranged to also contain a thermometer well and a pressure gauge fitting similar to those previously shown thereby eliminating the need for those instruments in well 58 and making it possible to reduce the diameter of the well 58, if desired. Also, the control well 60, as a control compartment, can be advantageously located near the ground level of the car similar to the bottom well 96. If it is located below the center line of the car, the water drain 82 need not be provided, which can be a distinct advantage in some situations.

The control well 60 when closed forms a totally sealed control compartment 290 which prevents any leakage from the controls escaping to the atmosphere during shipment of the vessel. Furthermore, these important controls for the internal car valves being positioned in a recessed sealed compartment are more likely to survive a wreck. In the event of leaks the car discharge ports can be more easily serviced in the field due to the separate control well 60. This is because these wells can be closed off by service personnel using the remotely controlled valves without having to closely approach the leaking valves.

It is also within the scope of this invention to duplicate the arrangement in control well 60 at more than one location on the same vessel, as for example close to both of the vessel ends. This allows for the control of the valves from the most convenient point remote from the valve compartments regardless of the orientation of the car after a wreck.

As seen in FIG. 10, the drain pipe 82 has a similar construction as the drain pipes 80 and 72 of the wells 56 and 58, respectively. This includes a flange 291 for securing the drain pipe 292 to and through the bottom head 276. A bellows expansion joint 294 can be provided at the upper end of the drain pipe 292 and the lower end thereof secured in and to a boss 296 mounted to the lower portion of the tank shell. The boss 296 is similarly drilled and tapped for securing bolts for the top and bottom flanges 297 and 298, respectively. The drain pipe 292, which can be a one-and-a-half inch Schedule eighty pipe, can also have a steel ball float with magnet 297 sliding therealong to indicate the liquid/vapor interface within the vessel. Drain pipe 82 in FIG. 10 illustrates another type of water drain closure which remains attached to the car whether opened or closed.

FIGS. 11 and 12 illustrate in elevation and plan views another safety tank car (or highway trailer) of the present invention generally at 302. The car 302 is shown equipped with full shelf couplers 306 and 308 and external standard head shields 310 and 312. Referring to FIG. 12, a single flush mounted, cover plate 314 is mounted over a vertical well 316 at the top center of the vessel 318. This cover plate 314 can be easily accessed by personnel by way of the ladders 322, 324 and platform/handrail system 326. The vertical well 316 encloses the later-described pressure relief devices for the car under the cover plate 314. Also shown in dotted lines in FIG. 12 are two horizontal wells 328 and 330 passing across the diameter of the car near the ladders 322, 324. These horizontal wells 328 and 330 contain the liquid and vapor eduction connections, pressure gauges, thermo wells and so forth, as will be later described, and are also covered with flush mounting cover plates 332 and 334, respectively. The elevation view of the tank car 302 in FIG. 11 shows the horizontal wells 328 and 330 and the cover plates 332 and 334 therefor face on and the vertical well 316 (in dotted lines) running the interior of the vessel 321, preferably through the center thereof and through the bottom wall.

The bottom recessed well 340 containing the manhole cover and opening for access to the interior of the vessel 321 is also shown generally in FIG. 11. This recessed well is covered by a flush mounting cover plate 342 and is similar to the manway well 96 described in connection with FIGS. 3 and 4. Since the design of rail car 302 provides for separate eduction, the manway well 340 does not need to contain an unloading valve and thus can be considerably shallower, if desired. It can, however, also contain the controls for optional internally mounted, remotely controlled valves (not shown). The diameter of the manway well 340 is large enough to allow for easy passage into and out of the vessel 318 of the removable internal parts of the rail car 302. The manway well 340 can be conveniently located on the side of the top of the vessel 318 if desired, in addition to its location near the bottom as illustrated in the drawings. The construction of the manway well 340 is discussed in greater detail later with respect to FIG. 18.

FIG. 13 is an enlarged cross-sectional view of the tank car 302 illustrating one of the horizontal liquid and vapor eduction wells 328 (or 330). The eduction wells 328 and 330 are positioned on opposite sides of the ladders 322, 324 (FIG. 12) for easy access thereto. FIG. 13 also shows the vessel shell or wall 346, the interior 348 of the vessel, and the high temperature resistant insulation 350 within insulation jacket 352, wherein the insulation preferably meets the criteria of U.S. DOT Docket HM175. The eduction well 328 forms a hollow tube 354, which is generally cylindrical in shape and can comprise a twelve inch, Schedule forty pipe for example. The tube 354 extends across the diameter of the vessel 318 and is firmly attached at both ends thereof by welding to the vessel wall 346. By positioning the unloading piping wells 328, 330 horizontally the problem of drainage of rain, snow melt, or wash water from the wells is eliminated, and thus no drain tubes are needed for them.

The vessel wall 346 is reinforced by a boss or pad 356 which provides a convenient thickening of the metal shell 346 in which blind holes 358 can be drilled and tapped for the attachment of the flush mounting cover plates 332 (or 334) and a surface to receive a gasket. Alternatively, a bolting ring 362 and a gasket surface can be welded to the interior of the tube 354 at a position such that the well cover plate 332 will again be flush with the exterior of the vessel wall 346. This alternative construction is illustrated in FIG. 15. The attaching bolts 364 for the cover plates 332 can be as illustrated in the drawings or preferably are counter sunk into the cover plate using Allen type capscrews thereby further improving the flush exterior surface of the vessel.

The metallurgy of the tube 354 and its thickness are preferably the same, or substantially the same, as that of the vessel wall 346 so that the tube can be easily welded to the wall. For that design the tube 354 forms a substantial stiffener for the vessel 318, actually adding strength to the vessel wall 346 near the areas of its attachment. In the event that this is not desirable, as when weight reduction is important, the walls of the tube 354 can be thinned and a bellows expansion joint inserted in the tube to relieve stresses from the expansion and contraction of the outer vessel wall diameter. (A suitable bellows expansion joint is shown in dotted lines in FIG. 16 for example.)

The well forms a protected cavity 366 within the protective envelope of the vessel for the mounting of one or more vessel fittings, such as the liquid and vapor eduction valves 368 and 370. Further, with the cover plates 332 secured in place, this cavity 366 also forms a unique pressure-tight container around the valves or fittings. A safety kit built into the tank car vessel is thereby provided. A separate, difficult to handle and install safety kit thus need not be provided on the tank cars. These safety kits are routinely used to allow for the field crews to "cap off" valves on tank cars and trailers found en route to be leaking.

The interior cavity 366 can be pressurized with an inert gas or fluid prior to and during shipment. Referring to FIG. 14, this pressurization can be done by a pressure source shown schematically at 372 and then through a small pressure fitting 374 on the cover plate 332. The pressure fitting 374 is mounted on the interior side of the cover plate 332 in a small recessed area 376 formed by welding a coupling 378 to the interior side of the cover plate. Access to the pressure fitting 374 is provided by a drilled and tapped hole 380 through the cover plate 332. This hole 380 is plugged by a flat fitting plug 382 when access to the pressure fitting 374 is not required.

The fluid (from pressure source 372) in the tube 354 can also act as an absorbent to neutralize any vessel contents that might seep from the fittings in the well 328. If the pressure in the well 328 is raised slightly higher than the working pressure of the vessel interior 348, which can be easily done with a suitable inert gas, the possibility of seepage of the contents of the vessel 318 through the fittings is eliminated entirely. This is because any seepage which occurs will necessarily be from the well 328 to the vessel interior 348. In either event, seepages of vessel contents to the environment en route are eliminated which is a significant improvement over conventional designs.

The exterior surface 384 of the cover plate 332 is smooth and presents no purchase points on which striking objects can snag. The cover plate 332 itself is preferably mounted to the well 328 and the vessel 318 such that its exterior surface 384 is flush with the exterior surface of the vessel shell wall 346. The insulation 350 and insulation cover or jacket 352 can project beyond this smooth exterior of the vessel 318 without compromising the integrity of the vessel or the well in the event of a wreck or impact.

FIG. 13 further illustrates unloading or eduction valves 368 and 370 in each well 328 (and 330), wherein the valves are quarter-turn valves such as ball valves. The rail car 302 would normally be equipped with two such wells 328 and 330, each with liquid and vapor valves, such that one liquid valve and one vapor valve are provided on each side of the car. In this configuration the car 302 can be connected to the unloading station piping (not shown) regardless of which side of the rail car 302 is facing the piping.

The unloading valves 368, 370 are positioned in the well 328 such that when the cover plate 332 is removed the blind flanges 386, 388 on the valves are directly facing the outside and within easy reach of the person making the tank car connections. The blind flanges 386, 388 can be replaced in some applications by threaded plugs if desired. The connection is made by the unloading person, and the valve is then operated by turning the stem of the quarter turn valve. This turning operation can be easily done with a short lever (not shown) or with a rachet handle (not shown) such as used to drive a socket wrench. Connection to the facing flanges of these valves can be facilitated by providing drilled and tapped holes in the mating flange of each valve so that cap screws can be used in making the connection. A threaded connection to the valve can also be substituted, if desired.

The valves 368 and 370 are connected by means of flanges 390 or 392, respectively, or by alternative conventional means such as threaded pipes and welding, to the eduction passage pipings 394, 396 which pass through the wall of the well tube 354 and then into the interior 348 or the vessel itself. At convenient locations in these pipings 394, 396 excess flow valves 398, 399 are installed to further protect against catastrophic leakage during the unloading process. This design provides sufficient room within the well 328 itself so that the excess flow valves 398, 399 and/or remotely controlled valves (not shown) can be conveniently located in the well cavity 366 rather than as shown in the vessel interior 348 which contains the product. This makes the servicing of the excess flow valves less difficult and hazardous since entry into the vessel itself is not required. The bodies of the excess flow valves 398, 399 (or remotely controlled valves) are still completely protected from impact. The wells 328 (and 330) also provide a convenient location for other instrumentation such as pressure gauge fittings 400 and thermo well fittings 401 as shown in dotted lines.

An externally-controllable internal valve and actuator 404 can be installed conveniently along the internal piping of each of the eduction pipes as shown by the dotted lines on the liquid eduction line 394 in FIG. 13. This valve and actuator 404 improves the integrity and serviceability of the vessel. Except for the feature of remote controllability, externally controlled internal valves are rendered unnecessary by this novel tank design for the following reasons:

a). the conventional valves are fully protected from impact and shearing off within the wells which themselves are fully protected within the envelope of the vessel wall;

b). the present novel well and cover plate configuration defines a built-in valve sealing safety kit to prevent leakage through packing glands or fittings to the environment;

c). the wells can be pressurized if desired to prevent any leakage of the fluid commodity into the well itself; and d). the wells can be easily or readily duplicated on the car. This duplication means that even if one set of valves is defective and must remain sealed off inside of its protective well that a second complete set of valves is provided in another well so that the rail car can still be conveniently unloaded before servicing the defective valves. The probability of simultaneous failure of the valves in all of the wells is extremely small as can be appreciated.

The vapor eduction piping 396 terminates in the upper vapor portion 402 of the vessel 318, as shown in FIG. 13, which allows for the withdrawal of the vapors. The liquid eduction piping 394 terminates in an optional bottom sump 405 to provide full liquid drainage. When the sump 405 is provided, any protrusions at the bottom of the vessel wall 346 are minimized and smoothly rounded so that no significant purchase points for any impacting objects are provided.

This placement of the unloading fittings in a fully protected location on the side of vessel, particularly at or below the center line of the vessel, is advantageous since the unloading crew need not climb to the top elevation of the tank which can be some thirteen feet in the air. Instead the crew can safely work from low level platforms only a few feet off of the ground or even on the ground itself. This greatly reduces the likelihood of potentially hazardous falls during tank car loading and unloading procedures. Many persons have been injured in railroad unloading/loading accidents in the past when they fell many feet to the ground while making connections to conventional tank cars. Additionally, the workers can service the unloading valves from a comfortable standing position while using these horizontally mounted internal valve wells 328, 330. The worker thus need not crouch, kneel or lie down to make the connections to the tank cars, as is now necessary with both bottom and top unloading cars. The worker is therefore at or near ground level and in a comfortable standing position. He can thereby rapidly complete his work and also easily and quickly escape from the area of the valve fittings in the event of the unexpected release of noxious tank contents during a connection procedure.

By removing the cover plates 332, 334 at both ends of the wells 328, 330 during unloading, flow-through ventilation of the wells can be easily provided by natural or forced ventilation, as by a fan positioned relative to the well, blowing escaping seepages away from the worker making the connection. The present design thus represents a significant improvement in tank car design from the standpoint of worker conveniences and safety.

FIG. 16 is a cross-sectional view of the rail car 302 showing the vertical well 316 secured within and to the vessel 318. This well provides a fully protective housing for the (four hundred and fifty pound) safety relief valve 408 preferably with an integral rupture disc assembly 410 upstream of the relief valve seat, a bottom unloading valve 412 and a magnetically-coupled tank level reading device 414. Other instrumentation and controls for internal devices in the tank can also be conveniently located in this well. The vertical well 316 protects all these devices with a strength at least equal to that of the vessel 318 itself, since the entire well 316 is contained within the protective envelope of the vessel walls 346. The well 316 is covered and sealed at both ends by cover plates 314, which mount flush with the outer surface of the vessel wall 346.

The well 316 can be formed by a tube 416, such as a ten inch Schedule 40S pipe 304 L S.S., from the top to the bottom of the vessel 318. The tube 416 is attached to the inner surfaces of the vessel 318 by means of flange connections 418 and bolts 420, and sealed by gaskets 422. This is an alternative to the welding connection used for the pipe of FIG. 13 and has three advantages. First, the metallurgy of the tube 416 and flange connections 418 can be substantially different from that of the vessel 318 without presenting any problems typically associated with dissimilar metal welding. Second, this flange connection 418 allows for the use of magnetically permeable materials such as stainless steel for the tube 416 which makes the magnetically-coupled level reading device 414 possible. Third, the tube 416 and its flanges 418 become removable, renewable parts of the vessel 318 so that the welding on the car itself during repairs is not necessary.

The vessel wall 346 is reinforced and thickened where the flanges 418 connect with pad or boss 438 at both ends of the tube 416. These thickened areas strengthen the vessel wall 346 at the points of penetration and form convenient surfaces for drilling and tapping blind holes 421 to mate with the bolts 420 securing the tube 416 and its flanges 418 to the vessel wall 346. It can also be machined to accept a suitable gasket seal. Another set of blind, drilled and tapped holes is made on the exterior side of the boss 438 along with a suitable gasket surface to mate with the bolts securing the top and bottom of the cover plate 314. The arrangement of the vessel wall 346, boss 438 and cover plates 314 is again such that the cover plates mount flush with the exterior surface of the vessel presenting no significant purchase points for impacting objects. The external bolts are preferably countersunk into the cover plates 314 to further reduce any purchase points for any impacting objects striking the vessel.

Alternatively, as in me ease of some of the previously-described designs, the cover plate 314 can be attached to the well 316, instead of to the vessel wall 346, by a bolting ring welded to the interior surface of the well wall in a position such that the outer surface of the cover plate 314 is flush with the outer surface of the vessel wall 346. A gasket surface on the bolting ring then seals the interior of the well 316.

The well tube 416 is generally cylindrical and preferably has a strength and thickness similar to that of the vessel wall 346. The tube 416 thereby functions as a stiffener and strengthener for the vessel 318 in the areas of its attachment. If this is not desired as for reasons of minimizing the weight of the well, the wall of the tube 416 can be thinned and an expansion joint or bellows, shown in dotted lines and by reference numeral 426, inserted in the wall of the tube 416 near the top thereof.

The top cover plate 314 is perforated by aperture 428 through which fluid can escape should the relief valve 408 in the tube 416 vent. This aperture 428 is fitted with a rain cover 430 and with a low pressure rupture disc assembly to permit the cavity around the relief valve 408 to be moderately pressurized if desired. In this manner, trace leakages into the cavity can be absorbed by a suitable absorbent material rather than seep to the external environment. Furthermore, with the optional disc assembly 432, the cavity can be completely sealed against rain and snow melt water thereby eliminating the need for water drainage tubes. One design of this invention provides a pressure tight joint between the cover and the pressure relief valve so that the rupture disc does not communicate with the cavity between the valve and the well.

A bottom cover plate 436, which is similar to cover plate 314 and is complete with pressurization fitting, is provided at the bottom of the tube 416. When the bottom cover plate 436 is employed, the bottom attachment of the well tube 416 is flanged to a boss 438 on the interior of the vessel 318 similar to the attachment on the top connection to the vessel. The fully protected bottom outlet valve 412 can be conveniently located then at the bottom area of the well 416 directly above the bottom cover plate 436. Valve 412 in FIG. 16 is depicted as a (one inch) angle valve with its connection to the vessel running through the tube 416 near the bottom of the vessel. The outlet connection piping 440 inside of the vessel 318 is equipped with an excess flow valve 442 and can be equipped also with an externally controllable internal valve shown with dotted lines at 444.

The vertical well 316 can be transformed into a fully sealable, pressure tight compartment for use as a sealed safety kit on the conventional outlet valve 412, thereby eliminating the need for the externally controllable internal valve 444 by one of three means. First, the pressure relief valve 408 can be mounted in a separate well of its own and replaced if desired by an optional vapor eduction valve (not shown). In this case the top cover plate 314 would move with the relief valve 408 to the separate well and a cover plate for this vertical well similar to cover plate 332 would be used. Second, the pressure relief valve 408 can be fitted with a suitable seal, such as an O-ring compression system, to join it to the cover plate 314 and aperture and optional rupture disc assembly in a pressure tight manner such that the interior of the well cavity and the aperture do not communicate. Third, a bulkhead 448 can be installed (removably if desired) across the tube 416, as shown with dotted lines, allowing for the independent pressurization of the upper well cavity 450 and the lower well cavity 452. If the bulkhead 448 is installed, the level "signal" can still be sensed above and below the bulkhead with relative ease from the upper and lower well cavities 450 and 452. Direct waste liquid drainage, if desired, from the upper well cavity 450 can be provided by a flexible or rigid tube 451a connecting the upper well cavity 450 to the outside environment by passing through the bulkhead 448, the lower well cavity 452 and the bottom cover plate 436. Any such waste liquid drain would be sealed in transit with a removable flush mounting plug on the cover plate and further equipped with an excess flow valve 451b which would close should the upper well cavity 450 pressurize due to a discharge from the relief valve 408.

The liquid level float magnet ring assembly 414 surrounds the outside of the tube 416 and floats on the liquid contents of the vessel 318. FIG. 17 shows in cross-section detail the magnetic float ring level assembly 414, which consists of five hollow spheres 454 connected by frame 456. The frame 456 holds a series of magnets on its inner circumference to project a magnetic field through a tube, such as the vertical tube 416 shown in FIG. 16, made of a magnetically transparent material, such as stainless steel. The field can easily be sensed and the location of the magnets and hence of the float easily determined. This magnetic field can be readily detected by a magnetic device inside of the upper well cavity 450 or the lower well cavity 452. Although similar level sensing devices are commercially available, the present novel vertically disposed tube 416 extending diametrically through the vessel 318 and protectively housing valves or other fittings therein lends itself readily to the installation of this magnetic float ring level assembly 414.

The relief valve 408 can have straight-through design as illustrated in FIG. 16 or can be an angle valve. It is connected to the interior of the vessel 318 by means of a relief valve passage (two inch) piping 460 beginning at the inlet of the relief valve in the upper well cavity 450 and passing through the wan tube 416 and then upwards into the vapor space 402 of the vessel 318 itself. An externally controllable, internally mounted shutoff valve, shown in dotted lines at 462, is preferably installed at a convenient point within the vessel 318 along the passage piping 460. This shutoff valve 462 increases the serviceability of the relief valve 408 if the relief valve has to be serviced while fluid product is in the vessel 318. However, this externally controllable, internal valve 462 can be made superfluous with the relief valve well design as shown in FIG. 16 by providing a completely self-contained safety capping kit for each relief valve. These relief valve wells further provide ample room for a completely protected standard shutoff valve (with or without remotely controlled actuators) shown with dotted lines at 463 to be installed and operated safely inside of the upper well cavity 450 upstream from the relief valve 408, also allowing for field servicing of the relief valve 408, if necessary.

The basic arrangement of the internal manway well 340 to the vessel 318 is illustrated in cross-section in FIG. 18. The manway cover or closure 466 is held in place against its gasket and mating gasket seal 470 by both the internal pressure of the vessel 318 and by a series of bolts or studs 472 threaded into blind, drilled, tapped holes around its circumference. These studs 472 pass through a removable rigid ring 474 through predrilled stud receiving holes and which bears against the exterior side of the manway well head 476. The studs 472 can be made to apply an evenly distributed and locally adjustable force to close and seal the manway closure 466. The closure 466 is hinged on the vessel interior 348 by a hinge 480 which helps position the closure 466 against its seating surface.

The head 476 of the well 340 is sufficiently strong to handle the internal pressure of the contents of the vessel 318. It can take the form of a flat plate as shown in FIG. 18 or of an elliptical or hemispherical head as desired. The well head 476 is attached to a well wall 482 which is also of sufficient strength to withstand the internal vessel pressure. If the cavity 484 of the well 340 is only to provide the manway access area, this wall 482 can be very short. If additional protected space in the cavity 484 is desired for the mounting of controls, valves or safety equipment, the wall 482 can be made longer, and thus the well 340 deeper, to accommodate the equipment.

The well wall 482 is attached, preferably by welding, to the vessel wall 346. The vessel wall 346 is thickened or reinforced in the area of attachment of the well wall 482 by a boss or pad 485. If the pad 485 is attached to the exterior of the wall 482, as is shown in FIG. 18, its edges are bevelled to present little, if any, purchase point area for impacting objects.

A thick cover plate 486 for the well 340 is mounted flush with the exterior surface of the vessel wall 346 or of the pad 485, which is even closer to the cover plate, again so that no significant purchase points are offered. The cover plate 486 is hinged conveniently to the exterior of the pad 485 or the vessel wall 346, as by means of a hinge 488. The hinge 488 is designed to break or shear away if struck, rather than to transfer significant stress to the vessel wall 346 or to the cover plate 486. The cover plate 486 is held firmly in place, when closed, preferably by means of countersunk Allen capscrews, which are threaded into blind, drilled, tapped holes 490 in a bolting ring 492 which in turn is welded to the interior surface of the vessel wall 346 such that the exterior surface of the cover plate 486 is flush with the exterior smooth surface of the tank car shell 346. The cover plate 486 can be rolled, if desired, to conform when in place to the exterior contour of the vessel.

The bolting ring 492 has a gasket surface and gasket 496 so that the well cavity 484 can be sealed gas tight and thereby form a safety seal against chance leakage from the manway cover seal. Small seepage into the cavity 484 from the manway cover seal can be absorbed by a suitable absorbent material if desired. Alternatively, the cavity 484 can be pressurized by an inert gas to a pressure in excess of the tank car pressure.

The cavity 484 can be advantageously used to contain equipment, tools and supplies for emergency repairs of the tank car 302 in a completely protected environment. This equipment can include items not now readily transportable to emergency scenes by repair crews aboard scheduled commercial flights due to government prohibitions. Such items could include fresh breathing air cylinders, a generator with fuel/oil, flares and specialized tools. A safety capping kit such as shown schematically at 498 for field crews to cap off a leaking vessel valve is an example of a storable item. These uses of the protected cavity 484 substantially improve the ability of repair crews to deal with leakages en route.

A compressed gas safety transport tank of the present invention is shown generally at 500 in FIG. 19. Referring thereto, it is seen that it preferably comprises a front cab shown generally at 502 supporting the front portion of a cylindrical elongated tank 504 on a front wheel assembly 505. The tank 504 is supported on a rear wheel assembly shown generally at 506 at its rear end. It is understood that the tank 40, vessel 318, and tank 504 can be tank cars, cargo tanks, cylinders or any other pressure vessel. The internal mechanical arrangement for the tank 504 is shown generally at 508 in dotted lines in FIG. 19 and in greater detail in FIG. 20 through a longitudinal plane of the tank 504.

Figure 21:
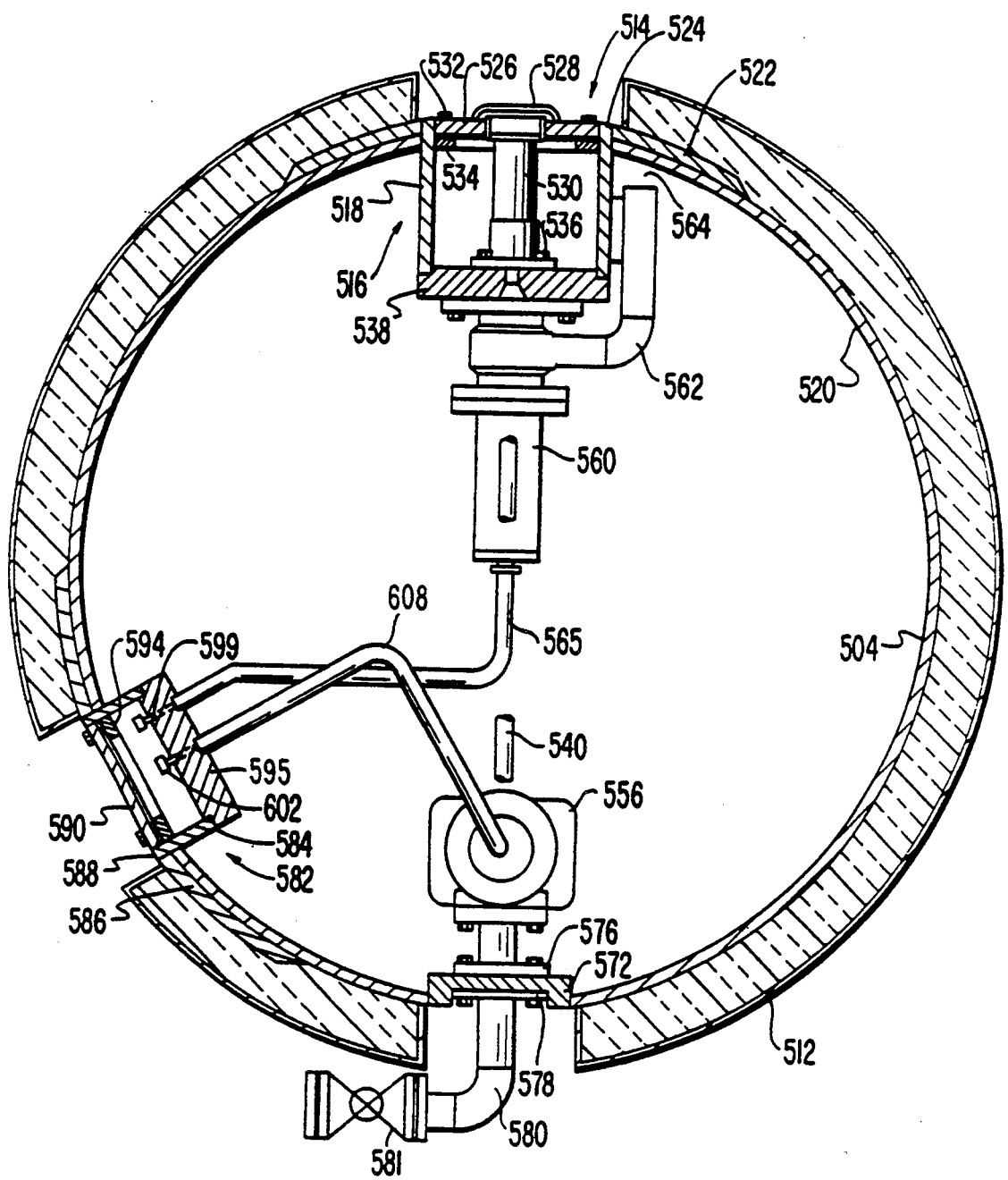
FIG. 21 is a side cross-sectional view of the mechanical arrangement of FIG. 20.

The tank 504 has a cylindrical cross-sectional shape, as is apparent from FIG. 21, and has smooth and curved end head surfaces. Insulation with a metal jacket covering with epoxy and fire retardant coating shown at 512 covers and protects the tank 504. An opening 514 is formed through the top surface of the tank 504 and a recessed well shown generally at 516 is fitted at the opening. The longitudinal walls or shell 518 of the recessed well 516 extend up through the shell 520 of the tank 504 at the opening. The shell 518 is generally flush with the top surface of the reinforcing pad 522 surrounding the opening 514, and thereby forms a rim 524 along its upper edge into which a cover 526 for the recessed area can be fitted. This cover 526 is provided with a blow-away rain cover 528 positioned over the relief valve 530 in the well. Bolts 532 are threadable through the cover and into a support ring 534 for removably securing the cover 526 over and to the shell 518. The relief valve 530 is mounted by bolted blind flanges 536 to the well head 538 which is secured to the lower ends of the well shell 518.

Excess fluid can drain through the drain tube or pipe 540 secured in and passing through the well head 538. Pipe 540 can be sealed with blind flanges 542 and optional rubber stops 544 (for emergency use). Pipe 540 is built with an expansion bellows 546, and a lower boss 548 secured to the shell 520 at a lower opening therethrough. The drain pipe 540 is secured to the boss 548 via upper and lower flanges 550 and 552 similar to the previously-disclosed embodiments. Similarly, a steel ball, liquid level indicating float 554 with magnet can slide up and down the drain tube 540 to react with a gauge stick moving inside the tube as in a device manufactured by Midland Manufacturing, for example.

Associated with the relief valve 530 and mounted within the protective envelope of the tank 504 are the internal liquid and vapor valves 556, 558, whose operations are similar to those described in the previously-disclosed embodiments. An internal tank safety shutoff valve 560 of the relief valve 530 is secured to the lower surface of the well head 538 directly beneath the relief valve 530.

A vapor stand pipe 562 comes off at ninety degrees from the internal tank safety shutoff valve 560 and passes upwardly to and opens in the vapor space area 564 inside of the tank 504. At its other end the internal tank safety shutoff vapor valve 560 is connected to a pressure transfer tube 565. (The vapor stand pipe 566 from the vapor valve 558, as best shown in FIG. 20, is slip fit at its upper end in a vapor stand pipe top anchor 568 which is welded to the tank shell 520.) Directly beneath the internal tank safety shutoff valve 560 an opening passes through the bottom of the tank shell 520. A boss 572 is welded to the tank shell 520 at this opening and holes are drilled and tapped therethrough. These holes are provided for the bolting flanges 576 and 578 on either side thereof. A manifold 580 passes from the internal liquid valve 556 through the flanges 576 and 578 and the boss 572 to the exterior of the tank shell 520. An external shutoff valve 581 with a blind flange is secured to the lower end of the manifold 580.

Figure 22:
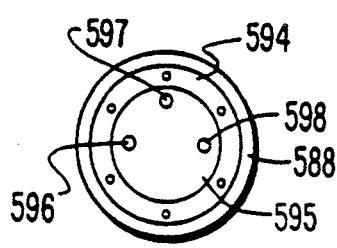
FIG. 22 is a plan view of the support ring for the recessed cover of the tank mechanical arrangement of FIG. 21.

A bottom angled recessed area 582 on a lower side surface of the tank 504 is shown by the dotted lines in FIG. 20 and in cross-section in FIG. 21. This recessed area 582 includes a shell 584 attached generally perpendicular to the tank shell 520 and through an opening thereof. The shell 584 extends a slight distance beyond or is flush with the outer surface of the reinforcing pad 586 encircling this opening. The shell 584 at its outer end defines a rim 588 into which the cover 590 is removably fitted. The recessed cover 590 is boltable to the support ting 594 secured to the inner surface of the shell 584. The support ring 594 is shown in plan view with the cover 590 removed therefrom in FIG. 22. In the middle of this figure the recessed area well head 595 is shown secured at the inner ends of the shell 584. Openings 596, 597, 598 pass therethrough and quick connector couplings 599, 600 and 602 are provided thereat for the pressure transfer tubes 565, 606 and 608, respectively.

Pressure transfer tube 565 passes through the interior of the tank 504 from the lower end of the internal tank safety shutoff valve 560 to the quick connector coupling 599. Pressure transfer tube 606 passes from the internal tank safety shutoff vapor valve 558 at the bottom of the tank to the quick connector coupling 600. Pressure transfer tube 608 then passes from the lower internal tank safety shutoff liquid valve 556 to the quick connector coupling 602.

Referring to FIG. 20, an external shutoff valve 614 with blind flange positioned below the tank 504 for the internal tank safety shutoff vapor valve 558 similarly includes a manifold 616 passing through a boss 618 welded to the tank shell 520. The boss 618 has holes drilled and tapped therethrough for the bolting flanges 620 and 622. An internal tank liquid dip leg 624 is connected to the end of the internal tank safety shutoff liquid valve 556 opposite to that of the pressure transfer tube 608 and has its lower open end adjacent and opening to a sump 626 formed in the lower surface of the shell 520.

Figure 23:
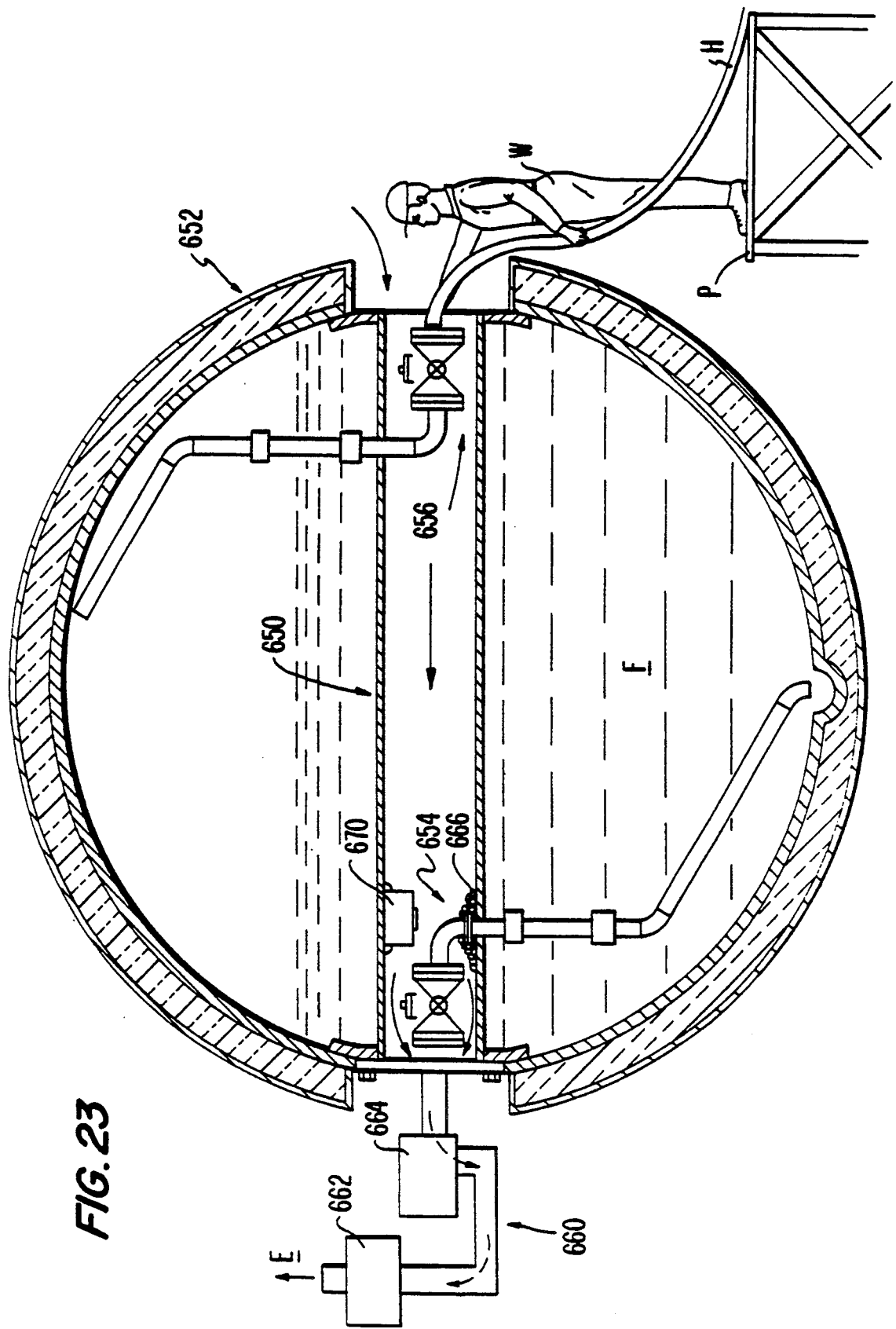
FIG. 23 is an enlarged cross-sectional view of another vessel of the present invention.

FIG. 23 shows a further embodiment of the present invention including a tube well shown generally at 650 extending diametrically through the entire tank car 652 from one side to the other, such as shown in FIG. 13. Further descriptions of many of the components illustrated in FIG. 23 are provided elsewhere in this disclosure as would be apparent to those skilled in the art. One or more valves 654, 656 communicating with the fluid F in the tank 652 are protectively enclosed within this well 650. The tube well 650 allows for both ends thereof to be opened when making connections to the valves or other fittings therein thereby providing improved ventilation and worker protection, such as for the worker W shown standing in FIG. 23 on platform P and operating hose H.

The tube well 650 can be connected at the loading and/or unloading site to a ventilation system shown generally at 660 for positively ventilating the well tube while the vessel or tank car 652 is connected. Thereby, leaking fumes can be exhausted away from the workman W and be safely released to the environment E. The exhaust gases are preferably sent to a treatment system 662, such as a scrubher or a flare furnace, prior to release to the environment E. The exhaust is accomplished by an aspirator assembly 664 (such as a venturi, fan or blower) connected to the opposite end of the well 650 from where the valve connection is to be made. Air is continuously pulled in from the other side past the connection valve 656 and through the vessel wall exiting the other side away from the workman W to the environment E, as shown by the arrows in FIG. 23.

The second fitting 654 as shown in the left side of the tube well 250 and referring to FIG. 23 can have a flange and an eduction pipe. Absorbent material 666 appropriate for the commodity or fluid F in the vessel or car 652 is positioned on the floor of the tube well 650 around this second fitting 654. The absorbent material 666 either physically adsorbs the leaked fluid or chemically neutralizes or fixes it for later disposal. Examples of suitable material 666 for a hydrogen sulfide fluid F vessel (652) are Iron Sponge which is a solid or a Mononethanol amine solution.

A safety kit 670 is shown secured into the tube well 650 for example in the vicinity of the second well 656 and accessible from the open second end. Safety equipment, which might be stowed in such a well in the place of the absorbent material 666 or in addition thereto or in place of, in the kit 670 or in addition thereto, might be properly packed tools, compressed breathing air tanks, a small air compressor or lighting equipment to be available for emergency response teams arriving at the site of an incident involving the car 652. Such equipment while protected from damage and theft by the well 650 and the well covers is still accessible to authorized personnel.

The operation procedure is as follows, prior to hookup as by hose H, the workman W removes both cover plates from the ends of the tube well 650 and hooks the ventilation system 660 up to the tube well 652 making this connection at the end opposite the end from which he plans to unload. He activates the aspirator assembly 664 and the treatment system 662 as appropriate to develop a velocity of several feet per second of air movement into the well entry near the right fitting 656. He then removes plugs and or flanges from the valve (656) or control he is accessing and makes his unloading or loading connection, as with hose H. Any leakage from the valve (656) (such as from packing or through the valve seat) escapes into the well 650, but instead of issuing into the face of the worker W is directed or sucked away from him and sent directly to treatment by the ventilation system 660, treated and exhausted to the environment E a safe distance from the worker W.

Thus, the safety vessels described above offer novel solutions to some vexing problems in the transportation and containment of hazardous fluid materials. In particular, these vessels help prevent nuisance leakages, especially during transportation; help prevent catastrophic failure of the vessels due to impacts, collisions, fires, explosions, derailments, and terrorism; help prevent vandalism to vessel fittings, especially during the transportation of the vessel; and help provide a safer working environment, especially for workers who are loading and unloading rail transportation vessels and for personnel who are handling railroad tank car leakage emergencies, especially those dispatched on short notice from distant places. Thus, the present invention provides a novel and practical safety vessel system which is adaptable to the transportation of hazardous materials by rail and highway, and also in stationary applications, such as in storage tanks, process vessels, and reactors.

This invention thus eliminates the reliance on conventional valves for a perfect seal by using an internal valve/actuator device remotely controlled from the outside environment and/or placing conventional valves inside of sealable compartments or wells which are fully contained within the smooth protective envelope of the vessel wall. When either, or preferably both, of these steps are taken, the conventional valve, safely located inside of the well, can fail or leak and still not cause any discharge of material to the environment.

With the internal valve and actuator closed, there is no available pressure to leak from the external valve. In many applications, it may be possible for the conventional valve which is positioned in the well to be eliminated entirely with the port to the fully-contained internal valve and actuator being blocked with a highly reliable flange and gasket. If the sealed well system is used, then even leakage from the valve, fittings or flanges in the well is contained behind a simple, highly reliable flange and plug system sealing the well from the environment. If multiple sealed wells as disclosed herein are used, the transport vessel can move safely to its destination to be unloaded on schedule following the complete failure of the valves or fittings in any one of the wells. The vessel at its destination can then be repaired without any delay, danger or leakage to the environment. The sealed wells, of course, can also be pressurized with a suitable inert gas, generally nitrogen or carbon dioxide, before shipment so that none of the car's contents leaks even into the wells, which is desirable for safety or corrosion reasons. Alternatively, a suitable absorbent material can be placed in the wells to absorb any trace leakage materials from the vessel interior.

The catastrophic failure of transportation vessels following wrecks or derailments is sometimes abetted by the fires which follow due to the failure of other nearby vessels. Fire and explosion can cause stationary vessels to fail, and impact damage from passing vehicles as well as debris from nearby accidents and explosions can cause the vessel contents to discharge.

Regulatory bodies have required that head shields be used at the ends of rail vessel cars to protect against end impacts. The safety vessel system described above for rail and highway vessels can also and additionally include such shields. Further, the overall vessel wall thickness can be increased and/or additional shielding applied to protect against penetrating impacts on the side and bottoms of the vessels.

Fire is another major cause of vessel failure. The present safety vessel system addresses the fire problem by incorporating a high temperature ceramic or an ablative coating material, such as "Thermo-Lag," to resist the effect of pool fires and impinging fires on the walls of the vessels. Although such coating or insulation systems are already required on many existing tank cars, they do not protect conventional valves and fittings. The present safety vessel system wherein valves and fittings are safely contained within the protective envelope of the vessel walls, however, shields the valves and fittings from the high temperatures of fire impingement. They are thus protected by both the sheer mass of the vessel and its contents, as well as by the cover plates and wells, and are thereby more likely to perform properly and reliably. Further, with the remotely-controlled internal valves and actuators in place on all of the vessel nozzles, including the relief valves, the discharge of any of the valves can be safely controlled, if necessary, when there is a fire. The vessels and their valves and fittings of the present safety valve system are thus more likely to survive fires.

The rounded surfaces of the vessel tend to deflect impacts, rolling away from them, rather than allowing the energy of the impact to tear the vessel, its nozzles or its fittings. The safety vessel systems of the present invention take advantage of this protective property of the smoothly rounded cylinders, ellipsoids and spheres by eliminating all protrusions from the vessel. In these shapes, the stresses are most evenly distributed over the entire shell of the vessel. Furthermore, these smooth curving shapes are inherently good deflectors of impact and piercing forces likely to be encountered when the vessel strikes an object, such as a steel rail, a railroad coupler, a vehicle, a boulder, a wall or an abutment during a wreck, or when a projectile such as a bullet, steel or rock fragment strikes the vessel as may occur during vandalism or an explosion. The vulnerable relief valves, other valves and fittings are all safely contained in wells within the walls of the vessel. The vulnerable protrusion of the manway nozzle is eliminated completely by the present submerged well manway.

The vessel is mounted on its supporting structure, such as trucks, wheels or skirt, by means of connections which are preferably weaker than the vessel walls to which they are attached. This can be accomplished by banding or by incorporating parts which are designed to uncouple or shear cleanly before the stress in the vessel walls exceeds approximately fifty percent of the allowable stress of the vessel walls. The present safety vessel systems are therefore free to tumble, roll or slide smoothly during an accident and spend their kinetic energy relatively smoothly and over a wide surface while deflecting impacts. The probability of vessel failure as from punctures or failure of the fittings, which can result in the catastrophic loss of the vessel contents, is therefore practically eliminated.

The safety vessel systems disclosed herein preferably include water hammer resistance features. Water hammer is a hydraulic effect of rapidly rising pressure inside closed vessels when a non-compressible fluid is suddenly decelerated as can theoretically occur in a few remotely possible wreck scenarios, such as a direct head-on collision with a hard immovable object. The water hammer resistance system of the present invention includes the four below-discussed design criteria.

First, the vessel walls are designed to be thick enough to withstand the peak pressure developed by the fluid in the vessel during a head-on impact at fifty miles per hour; the walls are preferably at least nine-tenths of an inch or more of steel. Second, hardened, highly stressed materials subject to brittle fracture are preferably excluded from the vessel walls. Third, external head protection and cushioning are provided by laminations, hydraulic cushioning and/or sacrificial cushioning, such as wood, designed to slow the rate of deceleration of the vessel and thereby reduce the stresses in the vessel walls. Fourth, an internal cushioning system, such as sacrificial head chambers or collapsible devices to slow the rate of deceleration of the fluid within the vessel, can be used. This rate deceleration greatly reduces the peak pressure attainable during an impact.

Vandalism is also a threat to the safe transportation of hazardous commodities. The present safety vessel system, by sealing all of the discharge fittings inside of closed, sealed wells, reduces the likelihood that a casual, untrained vandal can gain quick or obvious access to the protected valves. Special tools are required to gain access to the sealed wells of this invention. Additionally, the present remotely controllable, internal valves and actuators further reduce the probability of successful vandal access because the operation of these valves requires special equipment and knowledge not generally available to the public. The thickened walls of the present system, provided to increase the survivability of the vessel in the event of an impact, also resist small arms projectiles and explosives commonly available to vandals.

The present invention, especially when used in rail transportation, increases worker safety. Current designs of standard hazardous materials tank cars discourage bottom outlets due to the difficulty in guarding them from impact damage. As a result, unloading fittings are placed generally at the top and center of the car, requiring the workers to climb to and work at elevations of such height to cause serious injury in the event of a fall therefrom. Guard rails provide only limited protection from falling, and routes of escape are limited by the necessity of climbing down safely from the confined area of the top platform. A worker suddenly exposed to a hazardous concentration of escaping product during unloading or loading accidents runs a great risk of injury from falling from the top of the car, especially if he is rendered unconscious by the escaping material. Furthermore, top unloading connections force the workers to assume relatively uncomfortable crouching, kneeling or lying positions while connections are being made.

The designs of the present invention, while still allowing for top unloading if desired, eliminate the objections to bottom and side unloading positions. The valves of the present invention are completely protected during transportation from impact damage by the internal valve wells and cover plates. Massive bottom skid protection is thus not needed. The protection provided is also superior to that of current conventional bottom outlet valves which have only a portion of the valve and/or stem inside of the vessels.

A bottom liquid outlet makes gravity unloading of tank cars possible and is often preferable from an operating standpoint to pressure unloading. Bottom unloading connections can be made while standing, kneeling or sitting on the ground, eliminating significant falling hazards to the workers. With the protective valve wells of the present invention, conventional valves, if desired, can be safely used for bottom unloading applications. If the remotely controllable, internal valves and actuators of this invention are used, worker safety is also improved since the workers need not be near the valve during the valve opening and closing procedures. This reduces the likelihood of injury in the event a bad joint connection is made.

The side unloading alternative of the present invention provides other advantages. For example, workers can perform valve connections and operations from a comfortable full standing position at ground level if the side wells are placed in the lower portion of the vessel. If the side wells are placed on or near the mid-line position of the vessel, a short platform only a few feet off the ground is required. A fall or jump from such a height is not likely to cause significant injury. Furthermore, the worker need not and cannot place his head or face inside of the well in order to make connections. Also, these through-the-car wells can be readily ventilated according to this invention before and during loading and unloading operations further reducing the probability that the workers will be exposed to escaping hazardous materials.

Where a remotely controllable, internal valve and actuator is used, the loading and unloading system or operator can remotely close the valve connections from a safe distance. This is especially useful in the event of a fire or a downstream leak from the connected piping in the plant or factory. The valves, inside their respective wells, are protected from fire and impact damage even during material transfer operations. Of course, if total failure of downstream piping occurs, the internal excess flow valves disclosed herein automatically seal off the vessel.

The safety vessel system herein improves the ability of response teams to deal with emergency leak control during shipment, while at the same time greatly reducing the probability of the need for such leak control efforts. Each valve and fitting for the vessel, including the relief valves, has a built-in safety capping kit in the form of the valve well itself. These wells are sealed with extremely reliable and simple flange connections. The wells can be readily pressurized with an inert sealing fluid, if necessary, thereby providing another effective means of sealing off any leakage from a defective fitting therein. Response teams thus need not transport them or handle less effective, bulky, massive, conventional tapping kits when traveling to an accident scene. The possibility that a kit will not fit perfectly to the car is also eliminated.

Since there is sufficient protected room within the vessel for shut-off valves on the relief valves, the present design also provides an effective means of field replacing defective relief valves en route. Where a remotely controllable, internal valve and actuator is used, this shut off can even be safely accomplished from a location on the car remote from the defective relief valve. Even without a remotely controllable, internal valve and actuator in place, sufficient room exists in the wells to provide a conventional shut-off valve, with or without remote control, for the safety relief valves.

Finally, room can readily be provided within the manway well or another separate well for the secure storage of certain repair and safety equipment often needed by repair crews. This equipment is difficult to transport on commercial airliners due to government regulations or airline rules or size and weight restrictions. Such equipment includes containers of compressed breathing air, electric generators, compressors and specialized tools. It is thereby readily assured that when a trained emergency crew arrives at an accident scene involving a safety vessel of the present invention that all necessary and useful equipment is conveniently there for them. Locating such equipment within a massively protected well, under a cover, tends to assure its survival following wrecks and most common assaults.

From the foregoing detailed description, it will be evident that there are a number of changes, adaptations and modifications of the present invention which come within the province of those skilled in the art. However, it is intended that all such variations not departing from the spirit of the invention be considered as within the scope thereof as limited solely by the claims appended hereto.

What is claimed is:

1. A fluid transport vessel, comprising:
   an elongated tank having a tank interior, opposite tank ends, opposite first and second tank sides, a tank top and a tank bottom, one of said tank sides having a generally lateral through-opening;
   a wheel assembly supporting at least in part said tank;
   a well secured to said tank, recessed into said tank interior, and having a well interior communicable with said through-opening;
   a vessel fitting protectively mounted in said well interior; and
   a cover positionable in a closed position secured tight to said tank over said through-opening and an alternative open position providing operative access from outside of said tank to said fitting through said through-opening;
   wherein said well extends diametrically across said tank interior from said first side to said second side and is secured thereto.

2. The vessel of claim 1 further comprising bolt securing means for securing said cover in the closed position.

3. The vessel of claim 1 wherein said fitting comprises an unloading valve unloading fluid from said tank.

4. The vessel of claim 1 further comprising a relief valve well recessed into tank interior at said tank top and a relief valve operatively and protectively disposed in said relief valve well.

5. The vessel of claim 1 further comprising pressurizing means for pressurizing said well interior with said cover in the closed position.

6. The vessel of claim 1 further comprising a support ring secured to said tank first side at said through-opening and to which said cover is bolted when in the closed position.

7. The vessel of claim 1 wherein the outer surface of said cover when in the closed position is flush with and conforms to the outer surfaces of adjacent portions of said first side.

8. The vessel of claim 1 wherein said wheel assembly comprises a railroad tank car wheel assembly.

9. The vessel of claim 1 wherein said second side has a second side through-opening communicable with said well interior.

10. The vessel of claim 9 further comprising said cover defining a first cover, and a second cover positionable in a closed position over said second side through-opening.

11. A fluid transport vessel, comprising:

an elongated tank having a tank interior, opposite tank ends, opposite first and second tank sides, a tank top and a tank bottom, one of said tank sides having a generally lateral through-opening;

a wheel assembly supporting at least in part said tank;

a well secured to said tank, recessed into said tank interior, and having a well interior communicable with said through-opening;

a vessel fitting protectively mounted in said well interior; and a cover positionable in a closed position secured tight to said tank over said through-opening and an alternative open position providing operative access from outside of said tank to said fitting through said through-opening;

said vessel being pressurizable when said cover is in said closed position to provide a pressure-tight container around the fitting.

12. The vessel of claim 11 further comprising bolt securing means for securing said cover in the closed position.

13. The vessel of claim 11 wherein said fitting comprises an unloading valve for unloading fluid from said tank.

14. The vessel of claim 11 further comprising a relief valve well recessed into tank interior at said tank top and a relief valve operatively and protectively disposed in said relief valve well.

15. The vessel of claim 11 further comprising pressurizing means for pressurizing said well interior with said cover in the closed position.

16. The vessel of claim 15 further comprising a pressure fitting attached to said cover.

17. The vessel of claim 11 further comprising a support ring secured to said tank first side at said through-opening and to which said cover is bolted when in the closed position.

18. The vessel of claim 11 wherein the outer surface of said cover when in the closed position is flush with and conforms to the outer surfaces of adjacent portions of said first side.

19. The vessel of claim 11 wherein said wheel assembly comprises a railroad tank car wheel assembly.

20. The vessel of claim 11 wherein said well extends diametrically across said tank interior to said second side and is secured thereto.

* * * * *

UNITED STATES PATENT AND TRADEMARK OFFICE
CERTIFICATE OF CORRECTION

PATENT NO. : 5,386,845

DATED : February 7, 1995

INVENTOR(S) : Donald L. Zink

It is certified that error appears in the above-identified patent and that said Letters Patent is hereby corrected as shown below:

On the title page, under item [73],

[*]: replace "Oct. 12, 2010" with --Aug. 25, 2009--;

item [56] References Cited, under OTHER PUBLICATIONS:

replace "GATZ" with --GATX--.

Signed and Sealed this

Sixteenth Day of May, 1995

Attest:

BRUCE LEHMAN

*Attesting Officer*       *Commissioner of Patents and Trademarks*